(12) United States Patent
Yamrom et al.

(10) Patent No.: US 11,816,314 B1
(45) Date of Patent: Nov. 14, 2023

(54) CUSTOMIZABLE DASHBOARD INTERACTION FOR A USER INTERFACE

(71) Applicant: Rubrik, Inc., Palo Alto, CA (US)

(72) Inventors: Reuven Yamrom, Tzur Hadassah (IL); Barsa Tandukar, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/836,078

(22) Filed: Jun. 9, 2022

(51) Int. Cl.
*G06F 3/0484* (2022.01)
*G06F 9/451* (2018.01)
*G06F 3/04817* (2022.01)

(52) U.S. Cl.
CPC ........ *G06F 3/0484* (2013.01); *G06F 3/04817* (2013.01); *G06F 9/451* (2018.02)

(58) Field of Classification Search
CPC ........................... G06F 3/0484; G06F 3/04817
See application file for complete search history.

(56) References Cited

U.S. PATENT DOCUMENTS

| | | | | |
|---|---|---|---|---|
| 8,356,258 B2* | 1/2013 | Matthews | ........... | G06F 3/04883 715/830 |
| 2014/0351752 A1* | 11/2014 | Wu | ..................... | G06F 3/04817 715/810 |
| 2015/0082193 A1* | 3/2015 | Wallace | ............. | G06Q 30/0251 715/752 |
| 2015/0113428 A1* | 4/2015 | Liu | .......................... | G06F 9/451 715/745 |
| 2015/0199093 A1* | 7/2015 | Kuscher | ................ | G06F 3/0486 715/788 |
| 2016/0034156 A1* | 2/2016 | Vranjes | ............... | G06F 3/04842 715/800 |
| 2017/0139404 A1* | 5/2017 | Anand | ....................... | G06F 8/34 |
| 2018/0259934 A1* | 9/2018 | Piaskowski | ............ | G05B 15/02 |

* cited by examiner

*Primary Examiner* — Jeanette J Parker
(74) *Attorney, Agent, or Firm* — Holland & Hart LLP

(57) ABSTRACT

Some computing systems may implement a user interface to provide a visualization of system contents to a user. To place a widget or component within the user interface, a user may select from a plurality of candidate display regions that have different respective sizes. The size of the first widget may be adjusted from a prior size to a first size in response to the first widget being moved to at least partially overly a first candidate display region, and may be further adjusted from the first size to a second size in response to the first widget being moved to at least partially overly a second candidate display region. The widget may then be displayed within the second candidate display region after adjusting the size of the first widget to the second size.

18 Claims, 15 Drawing Sheets

CUSTOMIZABLE DASHBOARD INTERACTION FOR A USER INTERFACE

FIELD OF TECHNOLOGY

The present disclosure relates generally to data management, and more specifically to customizable dashboard interaction for a user interface.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

A DMS or other type of computing system may implement a user interface to provide visualization of information associated with one or more types of data. For example, a user interface may include a collection of widgets present within a dashboard display.

DETAILED DESCRIPTION

Figure 1:
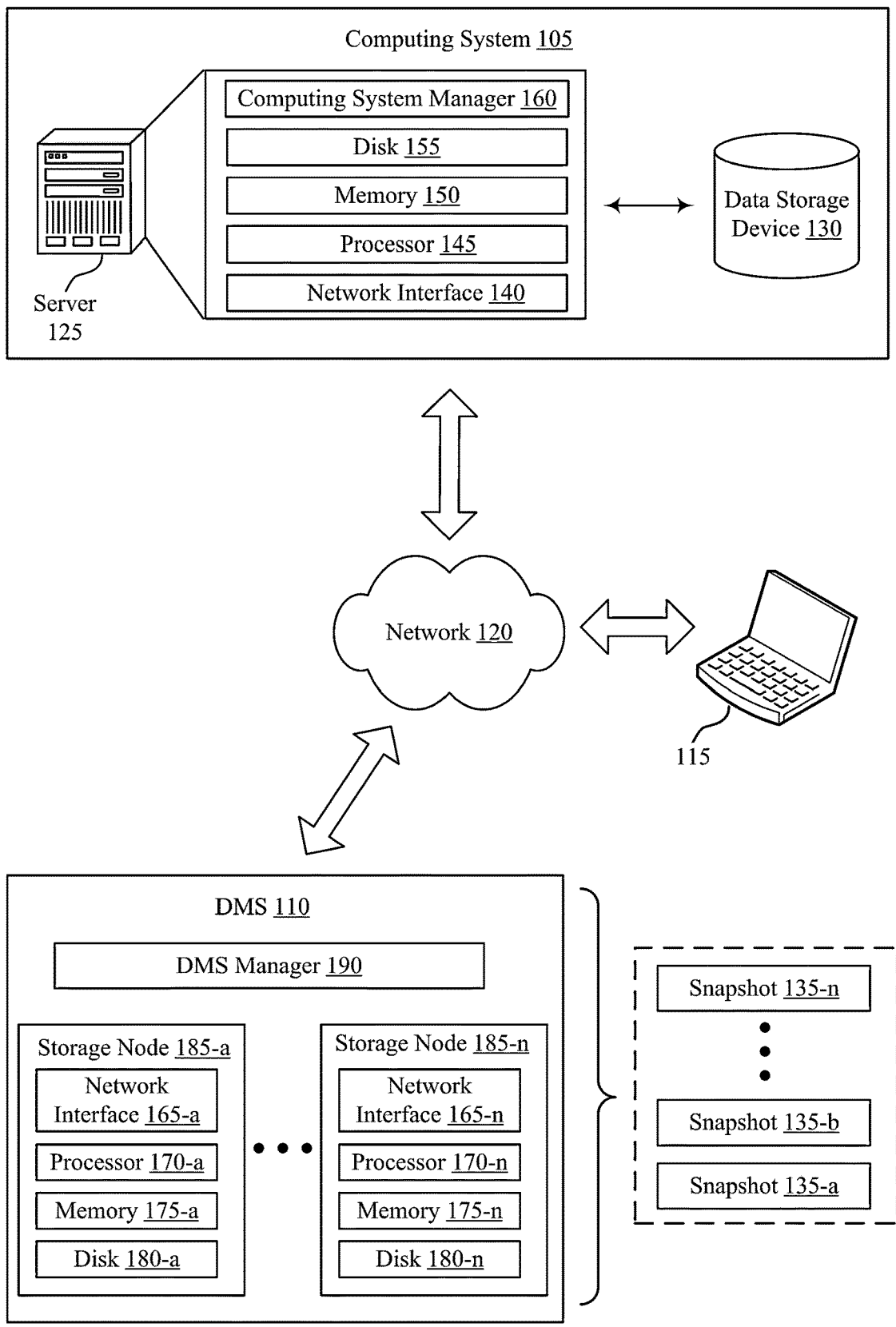
FIG. 1 illustrates an example of a computing environment that supports customizable dashboard interaction for a user interface in accordance with aspects of the present disclosure.

Some computing systems (e.g., data management systems (DMS) or other types of computing systems) may incorporate a user interface to provide a visualization of data within the system. For example, a user interface may display of a variety of different widgets (e.g., interface components) that may provide visualizations (e.g., charts, graphs, tables, lists, dropdown menus, or any combination thereof) of information associated with a computing system, or may otherwise enable a user to perform a function or access a service of the DMS. In some cases, a user may select a widget from a set of available widgets to display on a dashboard-style user interface, and may manually place the widget on the dashboard. This process of widget placement may involve manually sizing or scaling the widget to a certain location on the user interface. In some cases, however, the dashboard may become disorganized or may otherwise not optimally display the contents of a widget, especially when the dashboard has multiple widgets to display.

To increase the organization of the dashboard and to enhance the process by which the user interface is constructed and customized by a user, a feature for auto-sizing and auto-scaling widgets within the dashboard may be implemented. In some examples, the auto-sizing and auto-scaling may be based on corresponding sets of pre-defined sizes for each widget. The user may drag a widget onto the dashboard and over a specific "hitzone" (e.g., a designated area) for placing the widget. Once the widget is hovering over the hitzone, multiple different pre-defined candidate display regions for resizing the widget may be shown within the hitzone. A user may then select one of the candidate display regions for the widget based on locating the widget at a corresponding location within the hitzone, which may cause the selected display region to be highlighted or be made more distinguishable (e.g., shown more brightly or otherwise emphasized) relative to the other candidate display regions for the widget. Upon selection of the elected display region, the user interface may automatically adjust the size and location of the widget to the selected display region. In some cases, the user interface may also automatically adjust the contents of the widget (e.g., the scale of graphs or charts, the addition or elimination of information within the widget, or both) to align with a configuration corresponding to the selected display region (e.g., optimized for the size of the selected display region).

The sizes of the pre-defined candidate display regions may be optimized with respect to displaying the information of the corresponding widget, with respect to maintaining overall clarity and spatial utilization of the dashboard across multiple displayed widgets, or any combination thereof. For example, the widgets displayed on the dashboard may be optimally sized with respect to one another, such that the user interface maintains visual clarity even as the quantity of widgets displayed increases. Such processes for building and customizing a user interface may display information with improved clarity and improved convenience for users, and may reduce the time spent to construct an organized user interface.

Aspects of the disclosure are initially described in the context of an environment supporting a customizable dashboard interaction for a user interface. Aspects of the disclosure are further illustrated by and described with reference to apparatus diagrams, system diagrams, a process flow, and flowcharts that relate to customizable dashboard interaction for a user interface. Though examples may be described herein in which a user interface is provided as part of a DMS or other specific type of computing system, it is to be understood that the teachings herein may be applied and used as part of any user interface for any type of computing system.

FIG. 1 illustrates an example of a computing environment 100 that supports customizable dashboard interaction for a user interface in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

Some computing environments such as computing system 105 or DMS 110 may incorporate a user interface (e.g., at the computing device 115) to provide a visualization of data or processes within the system. For example, a user interface may display of a variety of different widgets (e.g., interface components) that may provide visualizations (e.g., charts, graphs, tables, lists, dropdown menus, or any combination thereof) of information associated with a computing system. In some cases, a user may select a widget from a set of available widgets to display on a dashboard-style user interface, and may manually place the widget on the dashboard. In some examples, the widget may include a visualization of one or more processes performed by the computing system 105 or the DMS 110. For example, the widget may show a visual representation of storage information, snapshot data, or other storage and backup information. The process of widget placement on a user interface, however, may involve manually sizing or scaling the widget which may less optimally display the contents of a widget, especially when the dashboard has multiple widgets to display.

To enhance the process by which the user interface is constructed and customized by a user, a feature for auto-sizing and auto-scaling widgets within the dashboard may be implemented. In some examples, the auto-sizing and auto-scaling may be based on corresponding sets of pre-defined sizes for each widget. The user may drag a widget onto the dashboard and over a specific candidate display region. Once the widget is hovering over the candidate display region, multiple different pre-defined candidate display regions for resizing the widget may be shown to select from. Upon selection of the elected display region, the user interface may automatically adjust the size and location of the widget to the selected display region. The sizes of the pre-defined candidate display regions may be optimized with respect to displaying the information of the corresponding widget, with respect to maintaining overall clarity and spatial utilization of the dashboard across multiple displayed widgets, or any combination thereof.

Figure 2:
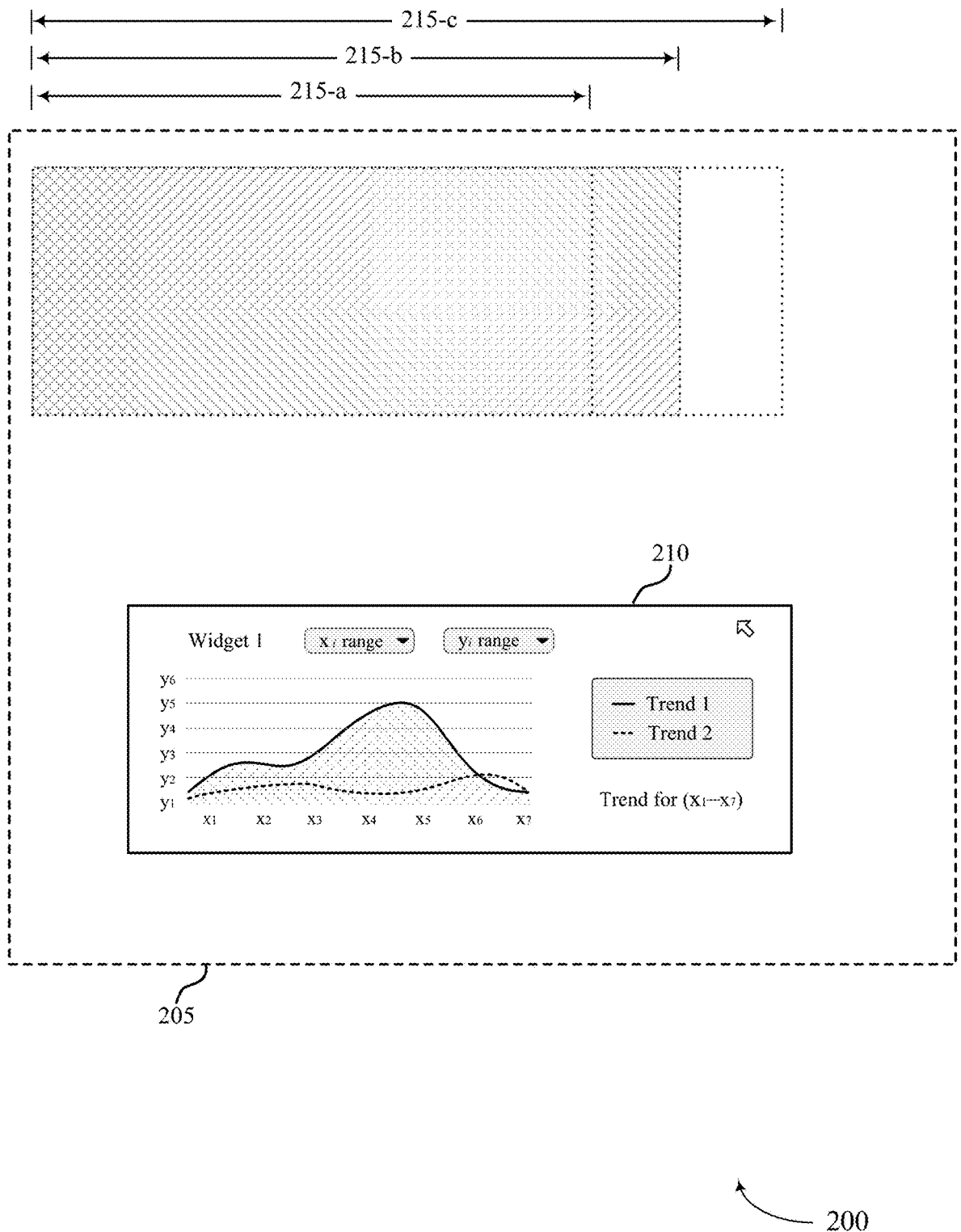
FIGS. 2 through 6 illustrate examples of widget placement configurations that supports customizable dashboard interaction for a user interface in accordance with aspects of the present disclosure.

FIG. 2 illustrates an example of a widget placement configuration 200 that supports customizable dashboard interaction for a user interface in accordance with aspects of the present disclosure. For example, FIG. 2 may show a user interface 205 which includes a first widget 210 and different candidate display regions 215-a, 215-b, and 215-c for placing the first widget.

In some examples, the user interface may support the display of different widgets. For example, the first widget 210 may that may display various system information in a visual or graphical format, and may provide a visualization (e.g., using charts, graphs, tables, lists, dropdown menus, or any combination thereof) of information associated with a computing system. In some examples, the first widget 210 may enable a user to perform a function of the DMS or otherwise or access a service of the DMS.

In some cases, a user may select the first widget from a set of available widgets to display on the user interface 205, and may manually place the widget on the dashboard. The widget may have an initial size when placed on the dashboard. In some cases, the user may manually drag the first widget 210 around the user interface to a desired location, and may manually size or scale the first widget to fit within the desired location. In some cases, however, this manual scaling process may not optimally display the contents of the first widget 210. Additionally or alternatively, the dashboard may become cluttered or may have reduced readability once multiple widgets are arranged using such manual scaling processes.

To increase the organization of the dashboard, a feature for auto-sizing and auto-scaling widgets within the dashboard may be implemented. For example, in some examples, the user interface may provide different pre-defined sizes for the first widget 210, for example, a set of corresponding candidate display regions 215-a, 215-b, and 215-c. The user may drag the first widget 210 onto the dashboard and over each candidate display region. The user may then select one of the candidate display regions 215 for the first widget 210 based on lateral movements of the first widget 210 over the display regions 215. Movement of the first widget 210 or any other widget may occur, for example, as a result of a user holding (e.g., grabbing, selecting) the widget using a mouse and moving the mouse cursor within the user interface, as a result of a user holding (e.g., grabbing, selecting) the widget using a finger or stylus in combination with a touch-screen interface and moving the finger or stylus within the user interface, among other possibilities. For example, the user may move the first widget to the right to size up to display region 215-c, and may move the widget to the left to size down to the display region 215-a. In such examples, the selected display region may be highlighted (e.g., as in display region 215-b) or be made more distinguishable (e.g., shown more brightly or otherwise emphasized) relative to the other candidate display regions for the first widget 210.

When the user selects a candidate display region, the first widget 210 may be automatically adjusted to the size of the selected display region. In some cases, the user interface may also automatically adjust the contents of the first widget 210 (e.g., the scale of graphs or charts, the addition or elimination of information within the widget, or both) to align with the size of the selected display region.

Figure 3:
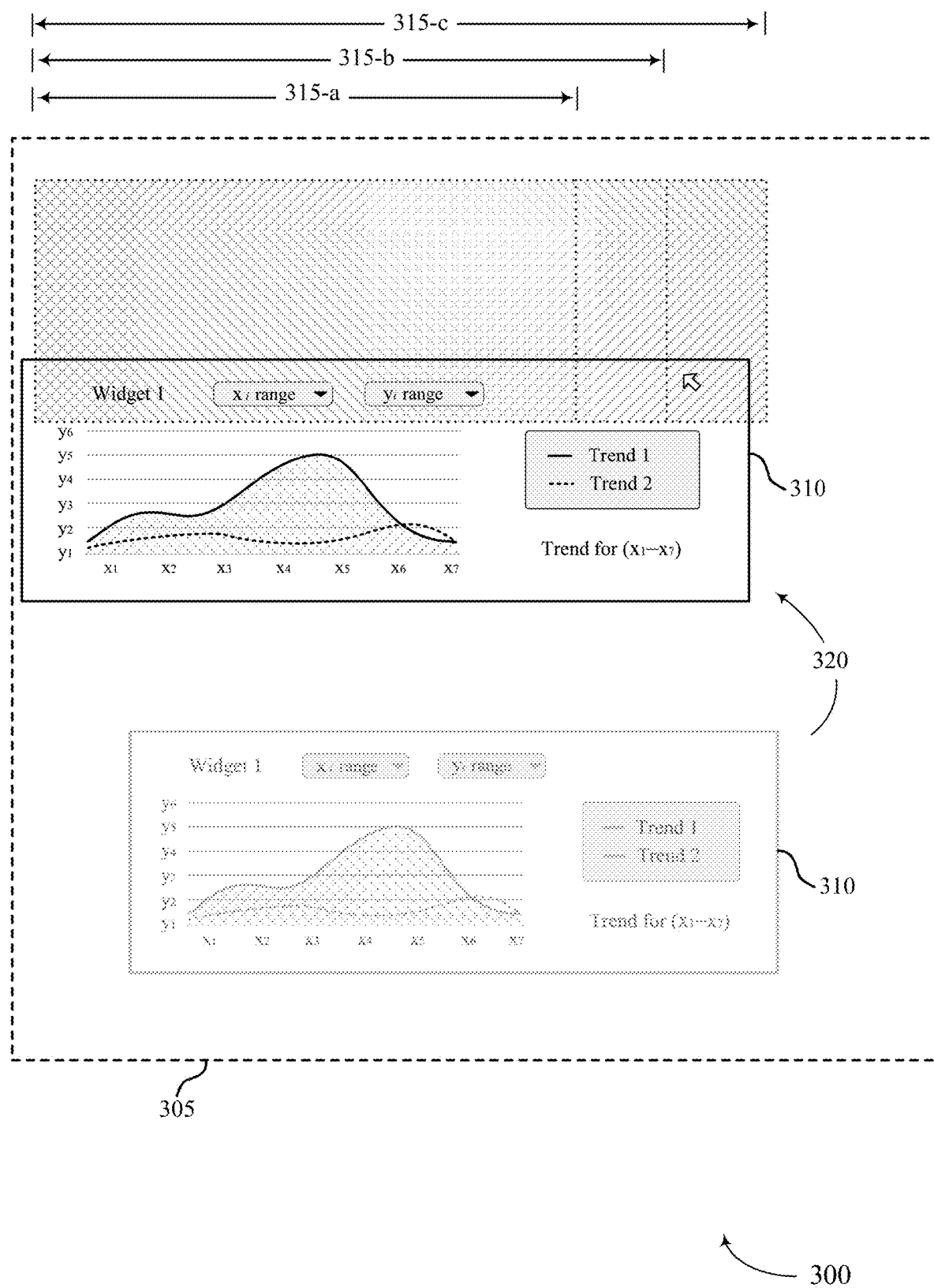

FIG. 3 illustrates an example of a widget placement configuration 300 that supports customizable dashboard interaction for a user interface in accordance with aspects of the present disclosure. For example, FIG. 3 may show a user interface 305 which includes a first widget 310 and multiple candidate display regions (e.g., a first candidate display region 315-a, a second candidate display region 315-b, and a third candidate display region 315-c) for placing the first widget 310.

At 320, the user may move the first widget within the user interface 305 so that the first widget 310 overlays the candidate display regions 315. In the example of FIG. 3, a majority of the first widget 310 may overlay the third display region 315-c such that the third display region 315-c is highlighted or otherwise distinguishable from the other display regions (e.g., first display region 315-a and second display region 315-b). The highlighting or distinguishing of the third display region 315-c may indicate a possible selection of the display region 315-c. In some cases, the first widget 310 may automatically resize or rescale to the size of the display region 315-c, which may provide the user with a visual preview or a visual representation of the widget contents when rescaled to the size of the third display region 315-c. For example, when placed over the third candidate display region 315-c the first widget 310 may be expanded relative to its initial size (e.g., its size when first placed within the user interface and before the move at 320), which may include a relative expansion of the components of the first widget 310, an addition of features or information to the first widget 310, an increase in text size within the first widget 310, among other changes.

Figure 4:
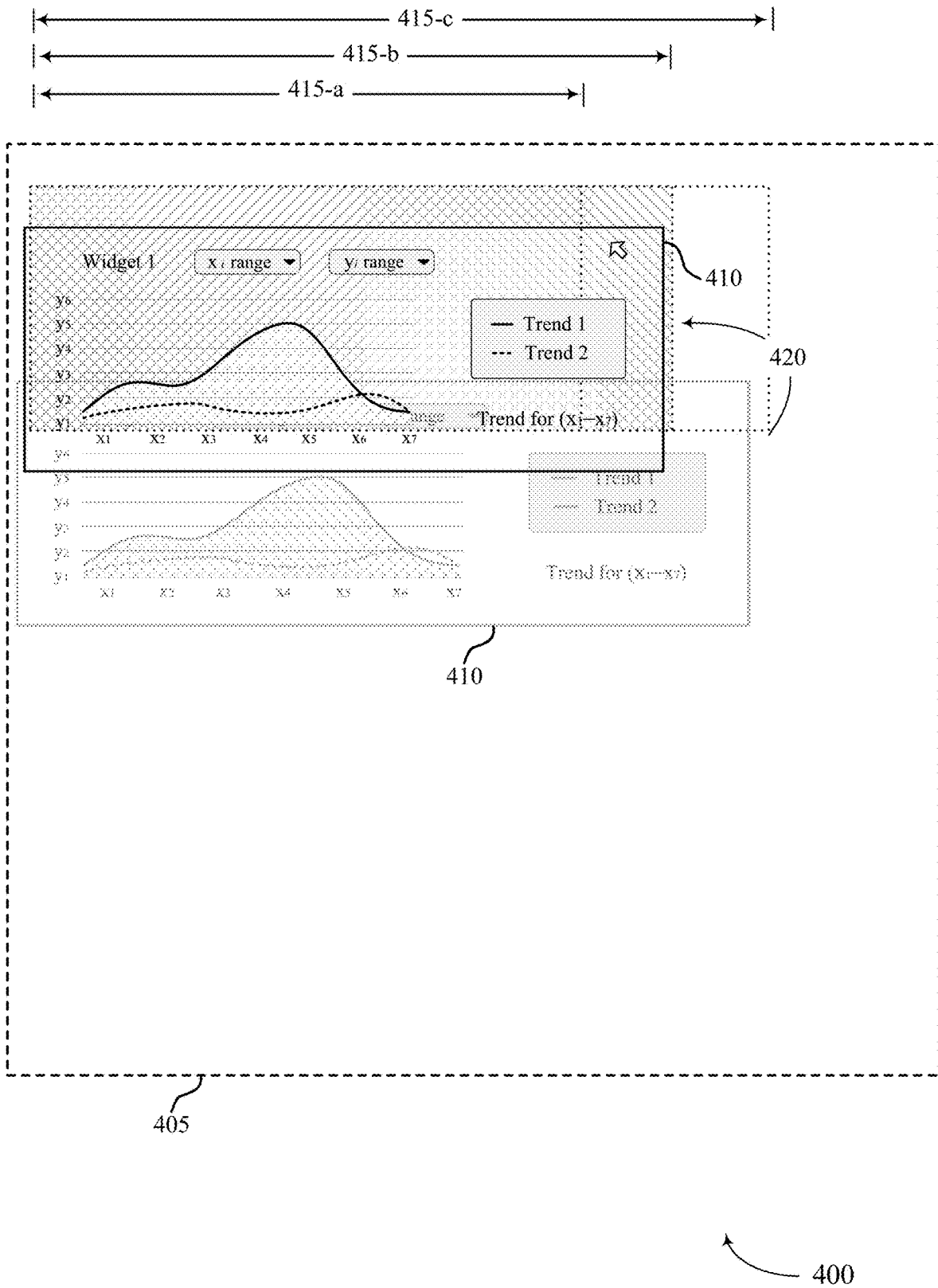

FIG. 4 illustrates an example of a widget placement configuration 400 that supports customizable dashboard interaction for a user interface in accordance with aspects of the present disclosure. For example, FIG. 4 may show a user interface 405 which includes a first widget 410 and multiple candidate display regions (e.g., a first candidate display region 415-a, a second candidate display region 415-b, and a third candidate display region 415-c) for placing the first widget 410.

At 420, the user may move the first widget within the user interface 405 so that the first widget 410 changes from overlaying the third display region 415-c to the second display region 415-b such that the second display region 415-b is highlighted or otherwise distinguishable from the other display regions (e.g., the second display region 415-b is distinguished from the first display region 415-a and second display region 415-b). The highlighting or distinguishing of the second display region 415-b may indicate a possible selection of the display region 415-c. In some cases, the first widget 410 may automatically resize or rescale to the size of the display region 415-b based on movement of the first widget 410 from the third display region 415-c to the second display region 415-b. The resizing or rescaling of the first widget 410 may provide the user with a visual preview or a visual representation of the widget contents when rescaled to the size of the second display region 415-b. For example, when placed over the second candidate display region 415-b, the first widget 410 may be reduced in size relative to its size when scaled to the third display region 415-c (e.g., relative to its size before the move at 420). The move from the third display region 415-c to the second display region 415-b may include a relative reduction or compression of the components of the first widget 410, an reduction of features or information displayed within the first widget 410, a reduction in text size within the first widget 410, among other changes. In some examples, the features of the first widget 410 may remain unchanged based on the relative size differences between the third display region 415-c and the second display region 415-b.

Figure 5:
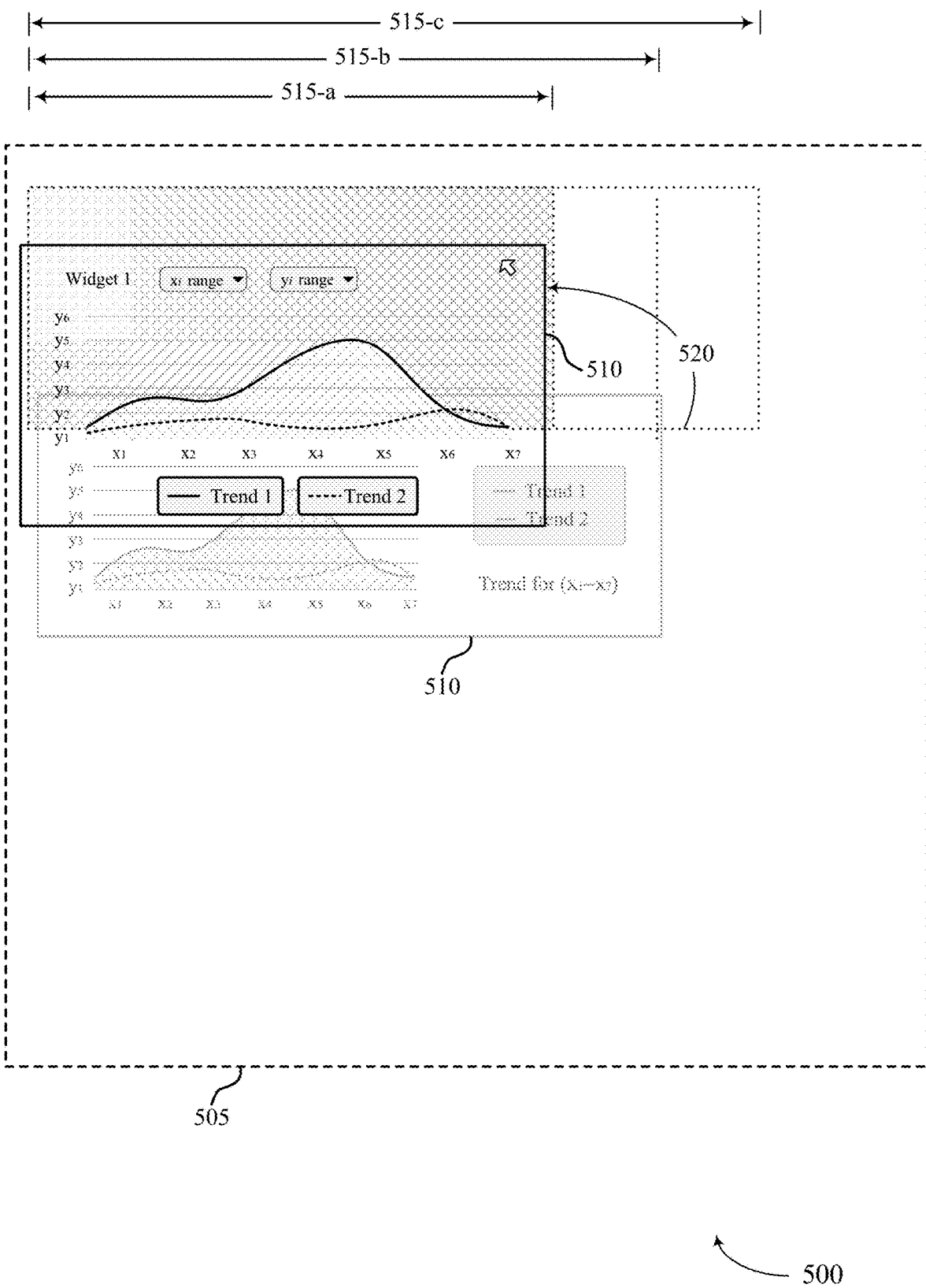

FIG. 5 illustrates an example of a widget placement configuration 500 that supports customizable dashboard interaction for a user interface in accordance with aspects of the present disclosure. For example, FIG. 5 may show a user interface 505 which includes a first widget 510 and multiple candidate display regions (e.g., a first candidate display region 515-a, a second candidate display region 515-b, and a third candidate display region 515-c) for placing the first widget 510.

At 520, the user may move the first widget within the user interface 505 so that the first widget 510 changes from overlaying the second display region 515-b to overlaying the first display region 515-a such that the first display region 515-a is highlighted or otherwise distinguished from the other display regions (e.g., the first display region 515-a is distinguishable from the second display region 515-b and the third display region 515-c). The highlighting or distinguishing of the first display region 515-a may indicate a possible selection of the display region 515-a for the first widget 510. In some cases, the first widget 510 may automatically resize or rescale to the size of the display region 515-a based on movement of the first widget 510 from the second display region 515-b to the first display region 515-a. The resizing or rescaling of the first widget 510 may provide the user with a visual preview or a visual representation of the widget contents when rescaled to the size of the first display region 515-a. For example, when placed over the first candidate display region 515-a, the first widget 510 may be reduced in size relative to its size when scaled to the second display region 515-b and the third display region 515-c (e.g., relative to its size before the move at 520). The move from the second display region 515-b to the first display region 515-a may include a relative reduction or compression of the components of the first widget 510, an reduction of features or information displayed within the first widget 510, a reduction in text size within the first widget 510, among other changes. For example, the trend information text (e.g., Trend 1 and Trend 2) may be removed from the widget in order to optimally display the trend graph within the first widget 510. In some examples, the features of the first widget 510 may remain unchanged or may be otherwise based on the relative size differences between the second display region 515-c and the first display region 515-a.

Figure 6:
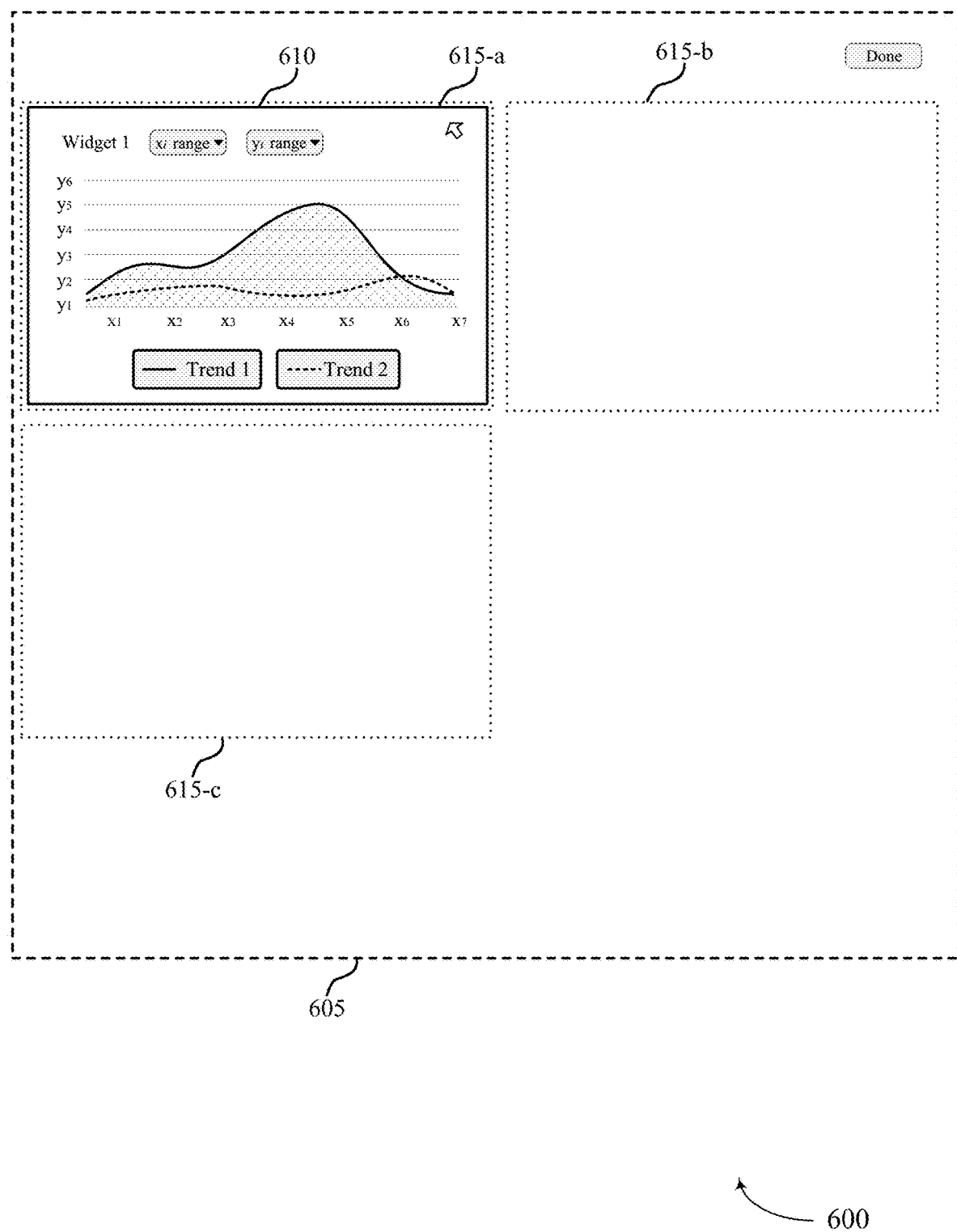

FIG. 6 illustrates an example of a widget placement configuration 600 that supports customizable dashboard interaction for a user interface in accordance with aspects of the present disclosure. For example, FIG. 6 may show a user interface 605 which includes a first widget 610 placed within a first selected display region 615-a, and multiple candidate display regions (e.g., a first candidate display region 615-b and a second candidate display region 615-c) for placing a second widget.

The first widget 610 may be placed in a selected display region 615-a based on the selection procedure described with reference to FIGS. 2 through 5. For example, the first widget may be resized or rescaled based on the selected display region 615-a. Upon placing the first widget 610 within the selected display region 615-a, the user interface 605 may display other candidate display regions that may be used for placing a second widget. In some examples, the size and location of the candidate display regions 615-b and 615-c may be based on the size and location of the first widget 610 or based on other widgets present within the user interface 605. For example, the locations of candidate display regions 615-b and 615-c may be locations that are optimized for organization or readability of the user interface (e.g., the candidate display regions 615-b and 615-c may be located so that the ordering of the user interface reads from left to right and top to bottom).

Figure 7:
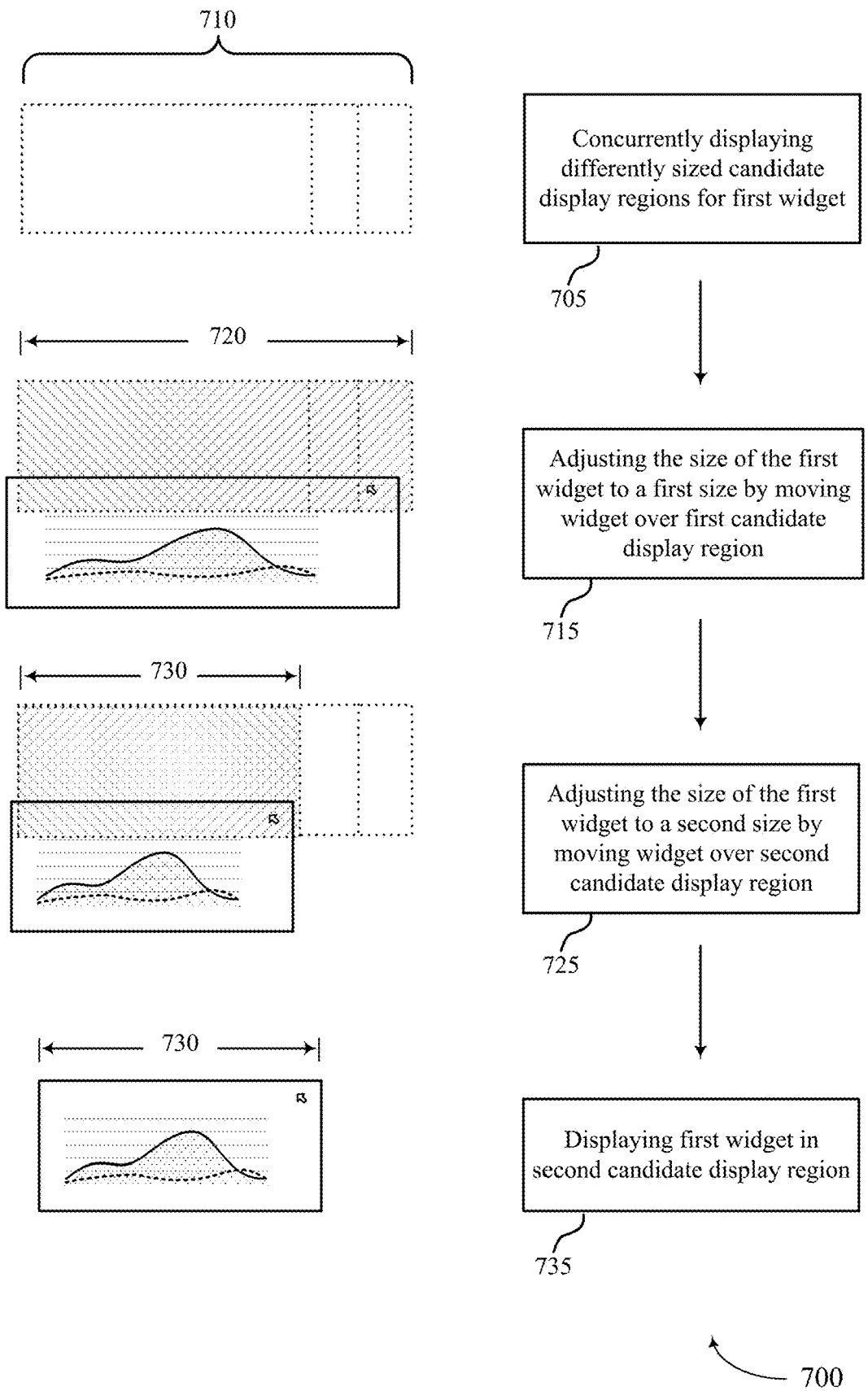
FIG. 7 illustrates an example of a process flow that supports customizable dashboard interaction for a user interface in accordance with aspects of the present disclosure.

FIG. 7 illustrates an example of a process flow 700 that supports customizable dashboard interaction for a user interface in accordance with aspects of the present disclosure. Process flow 700 may illustrate a process for formatting a widget within a user interface. In the following description of the process flow 700, the operations may occur in a different order than the example order shown, or the operations may be performed in different orders or at different times. Some operations may also be omitted from the process flow 700, and other operations may be added to the process flow 700.

At 705, the user interface may concurrently display a plurality of candidate display regions 710 for a first widget of the one or more widgets, wherein the plurality of candidate display regions 710 are at least partially overlapping within the user interface. the candidate display regions 710 may also have different respective sizes. In some examples, the different respective sizes for the plurality of candidate display regions 710 are based on an amount of space available for the first widget relative to one or more other widgets present within the user interface.

In some examples, at least two candidate display regions in the plurality of display regions have a common height or a common width. In some other cases, at least two candidate display regions included in the plurality of candidate display regions have a common boundary. In some other cases, at least two candidate display regions included in the plurality of candidate display regions have a common corner.

At 715, a size of the first widget may be adjusted from a prior size to a first size in response to the first widget being moved within the user interface (e.g., based on a user holding the widget using a mouse and moving the mouse cursor over the first candidate display region) such that the first widget at least partially overlies a first candidate display region 720 of the plurality of candidate display regions, the first candidate display region 720 having the first size. In some examples, the first candidate display region may be selected for the first widget (and the first widget may be re-sized to the first size) based on the first candidate display region 720 being a largest candidate display region that at least partially underlies the first widget.

In some examples, the brightness, color, format, or any combination thereof of the first candidate display region 720 may be altered in response to the first widget being moved within the user interface such that the first widget at least partially overlies the first candidate display region 720.

At 725, the size of the first widget may be adjusted from the first size to a second size in response to the first widget being moved within the user interface. For example, the first widget may be moved such that the first widget at least partially overlies a second candidate display region 730 of the plurality of candidate display regions (e.g., based on a user holding the widget using a mouse and moving the mouse cursor over the second candidate display region), the second candidate display region 730 having the second size. In some examples, adjusting the size of the first widget from the first size to the second size may include increasing the size of the first widget based on the second candidate display region 730 being larger than the first candidate display region 720. In some other examples, adjusting the size of the first widget from the first size to the second size may include decreasing the size of the first widget based on the second candidate display region 730 being smaller than the first candidate display region 720.

In some examples, a scaling factor may be applied to one or more components displayed within the first widget based on adjusting the size of the first widget from the first size to the second size, and the one or more components displayed within the first widget may be scaled in accordance with the scaling factor. In some examples, a quantity of components displayed within the first widget may be modified based on adjusting the size of the first widget from the first size to the second size, scaling the one or more components, or both.

In some examples, the brightness, color, format, or any combination thereof of the second candidate display region 730 may be altered in response to the first widget being moved within the user interface such that the first widget at least partially overlies the first candidate display region 720.

At 735, the first widget may be displayed within the second candidate display region 730 after adjusting the size of the first widget to the second size. In some examples, after displaying the first widget within the second candidate display region 730, the user interface may display a second plurality of candidate display regions for a second widget of the one or more widgets. Additionally or alternatively, the user interface may display one or more suggested locations for additional widgets after displaying the first widget within the second candidate display region. In such cases, the one or more suggested locations for additional widgets may be aligned horizontally or vertically aligned with the second candidate display region.

Figure 8:
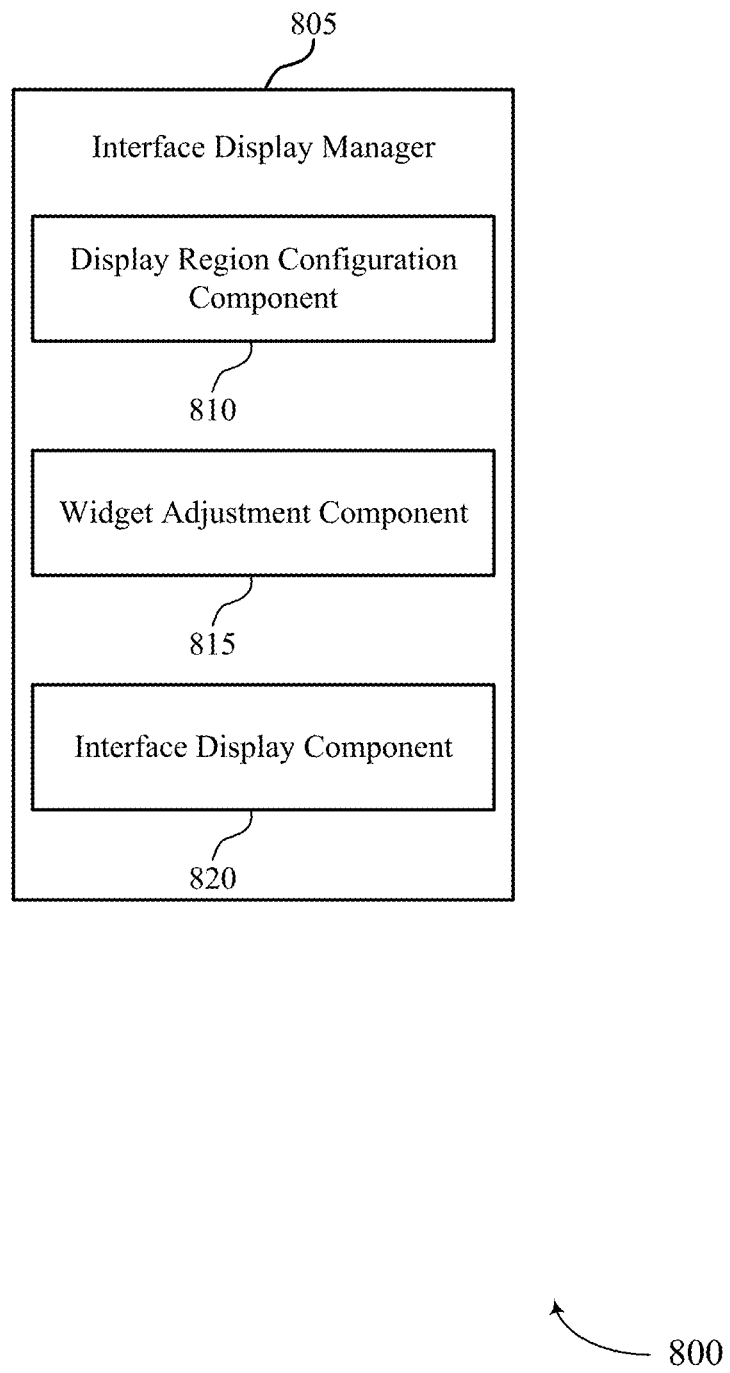
FIG. 8 shows a block diagram of an apparatus that supports customizable dashboard interaction for a user interface in accordance with aspects of the present disclosure.

FIG. 8 shows a block diagram 800 of an interface display manager 805 that supports customizable dashboard interaction for a user interface in accordance with aspects of the present disclosure. The interface display manager 805 may be an example of or include aspects of an interface display manager as described herein. The interface display manager 805, or various components thereof, may be an example of means for performing various aspects of techniques for customizable dashboard interaction for a user interface as described herein. For example, the interface display manager 805 may include a display region configuration component 810, a widget adjustment component 815, an interface display component 820, or any combination thereof. Each of these components may communicate, directly or indirectly, with one another (e.g., via one or more buses, communications links, communications interfaces, or any combination thereof).

The interface display manager 805 may support displaying one or more widgets within a user interface in accordance with examples as disclosed herein. The display region configuration component 810 may be configured as or otherwise support a means for displaying concurrently, within the user interface, a set of multiple candidate display regions for a first widget of the one or more widgets, where the set of multiple candidate display regions are at least partially overlapping within the user interface and have different respective sizes. The widget adjustment component 815 may be configured as or otherwise support a means for adjusting a size of the first widget from a prior size to a first size in response to the first widget being moved within the user interface such that the first widget at least partially overlies a first candidate display region of the set of multiple candidate display regions, the first candidate display region having the first size. The widget adjustment component 815 may be configured as or otherwise support a means for adjusting the size of the first widget from the first size to a second size in response to the first widget being moved within the user interface such that the first widget at least partially overlies a second candidate display region of the set of multiple candidate display regions, the second candidate display region having the second size. The interface display component 820 may be configured as or otherwise support a means for displaying the first widget within the second candidate display region after adjusting the size of the first widget to the second size.

Figure 9:
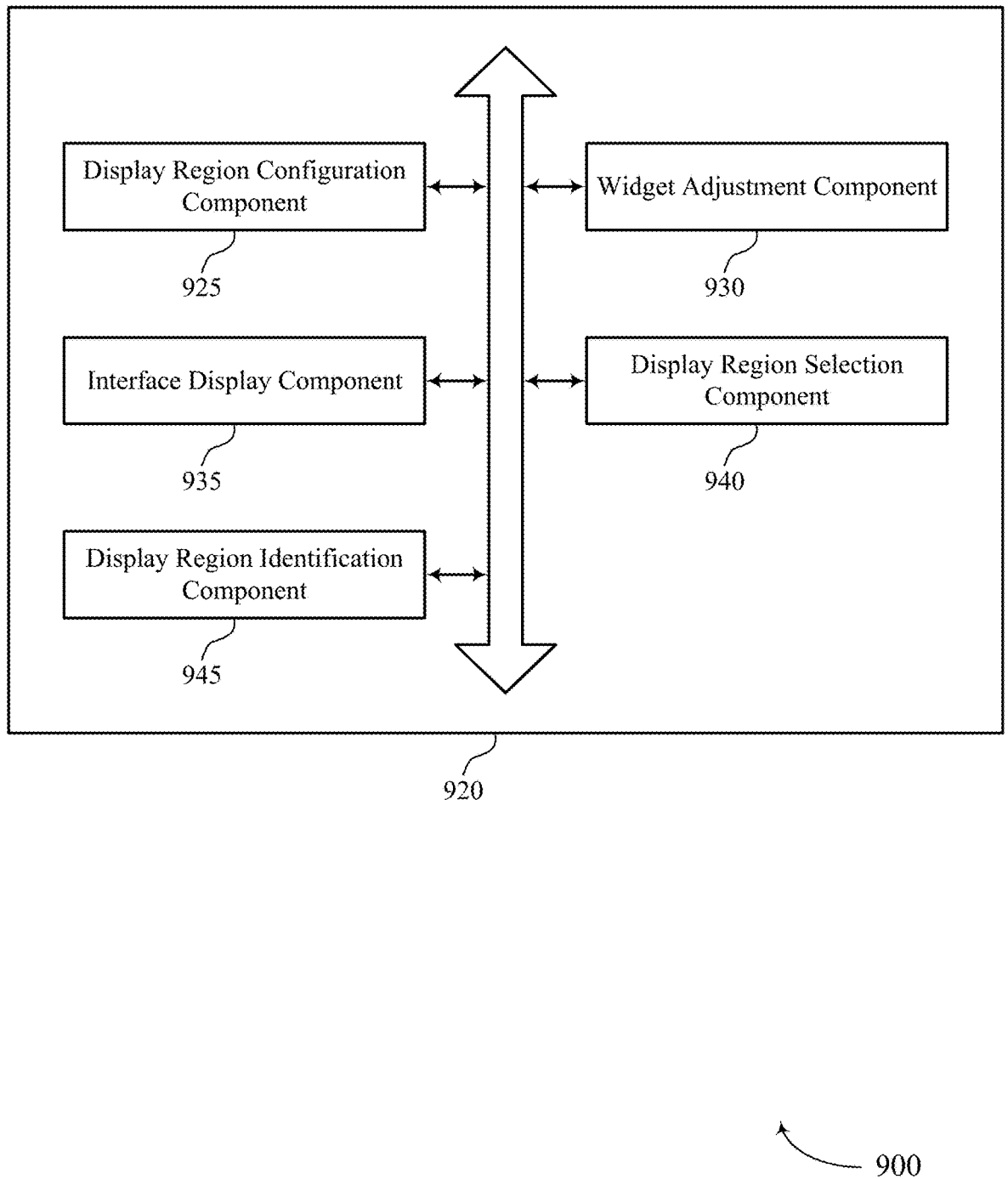
FIG. 9 shows a block diagram of an interface display manager that supports customizable dashboard interaction for a user interface in accordance with aspects of the present disclosure.

FIG. 9 shows a block diagram 900 of an interface display manager 920 that supports customizable dashboard interaction for a user interface in accordance with aspects of the present disclosure. The interface display manager 920 may be an example of aspects of an interface display manager or an interface display component 820, or both, as described herein. The interface display manager 920, or various components thereof, may be an example of means for performing various aspects of customizable dashboard interaction for a user interface as described herein. For example, the interface display manager 920 may include a display region configuration component 925, a widget adjustment component 930, an interface display component 935, a display region selection component 940, a display region identification component 945, or any combination thereof. Each of these components may communicate, directly or indirectly, with one another (e.g., via one or more buses).

The interface display manager 920 may support displaying one or more widgets within a user interface in accordance with examples as disclosed herein. The display region configuration component 925 may be configured as or otherwise support a means for displaying concurrently, within the user interface, a set of multiple candidate display regions for a first widget of the one or more widgets, where the set of multiple candidate display regions are at least partially overlapping within the user interface and have different respective sizes. The widget adjustment component 930 may be configured as or otherwise support a means for adjusting a size of the first widget from a prior size to a first size in response to the first widget being moved within the user interface such that the first widget at least partially overlies a first candidate display region of the set of multiple candidate display regions, the first candidate display region having the first size. In some examples, the widget adjustment component 930 may be configured as or otherwise support a means for adjusting the size of the first widget from the first size to a second size in response to the first widget being moved within the user interface such that the first widget at least partially overlies a second candidate display region of the set of multiple candidate display regions, the second candidate display region having the second size. The interface display component 935 may be configured as or otherwise support a means for displaying the first widget within the second candidate display region after adjusting the size of the first widget to the second size.

In some examples, the display region selection component 940 may be configured as or otherwise support a means for identifying the first candidate display region as a first selected display region for the first widget based on the first candidate display region being a largest candidate display region that at least partially underlies the first widget, where adjusting the size of the first widget from the prior size to the first size is based on identifying the first candidate display region as the first selected display region for the first widget.

In some examples, adjusting the size of the first widget from the first size to the second size includes increasing the size of the first widget based on the second candidate display region being larger than the first candidate display region and the first widget newly overlying at least a portion of the second candidate display region.

In some examples, adjusting the size of the first widget from the first size to the second size includes decreasing the size of the first widget based on the second candidate display region being smaller than the first candidate display region and the first widget ceasing to at least partially overly the first candidate display region.

In some examples, the display region identification component 945 may be configured as or otherwise support a means for altering a brightness, a color, a format, or any combination thereof of the first candidate display region in response to the first widget being moved within the user interface such that the first widget at least partially overlies the first candidate display region. In some examples, the display region identification component 945 may be configured as or otherwise support a means for altering a brightness, a color, a format, or any combination thereof of the second candidate display region in response to the first widget being moved within the user interface such that the first widget at least partially overlies the second candidate display region.

In some examples, the widget adjustment component 930 may be configured as or otherwise support a means for identifying a scaling factor for one or more components displayed within the first widget based on adjusting the size of the first widget from the first size to the second size. In some examples, the widget adjustment component 930 may be configured as or otherwise support a means for scaling the one or more components displayed within the first widget in accordance with the scaling factor.

In some examples, the widget adjustment component 930 may be configured as or otherwise support a means for modifying a quantity of components displayed within the first widget based on adjusting the size of the first widget from the first size to the second size, scaling the one or more components, or both.

In some examples, the different respective sizes for the set of multiple candidate display regions are based on an amount of space available for the first widget relative to one or more other widgets present within the user interface. In some examples, at least two candidate display regions included in the set of multiple candidate display regions have a common height or a common width. In some examples, at least two candidate display regions included in the set of multiple candidate display regions have a common boundary. In some examples, at least two candidate display regions included in the set of multiple candidate display regions have a common corner.

In some examples, the display region configuration component 925 may be configured as or otherwise support a means for displaying concurrently, within the user interface, a second set of multiple candidate display regions for a second widget of the one or more widgets after adjusting the size of the first widget to the second size.

In some examples, the display region configuration component 925 may be configured as or otherwise support a means for displaying, within the user interface, one or more suggested locations for additional widgets after displaying the first widget within the second candidate display region, where the one or more suggested locations for additional widgets are aligned horizontally or vertically aligned with the second candidate display region.

Figure 10:
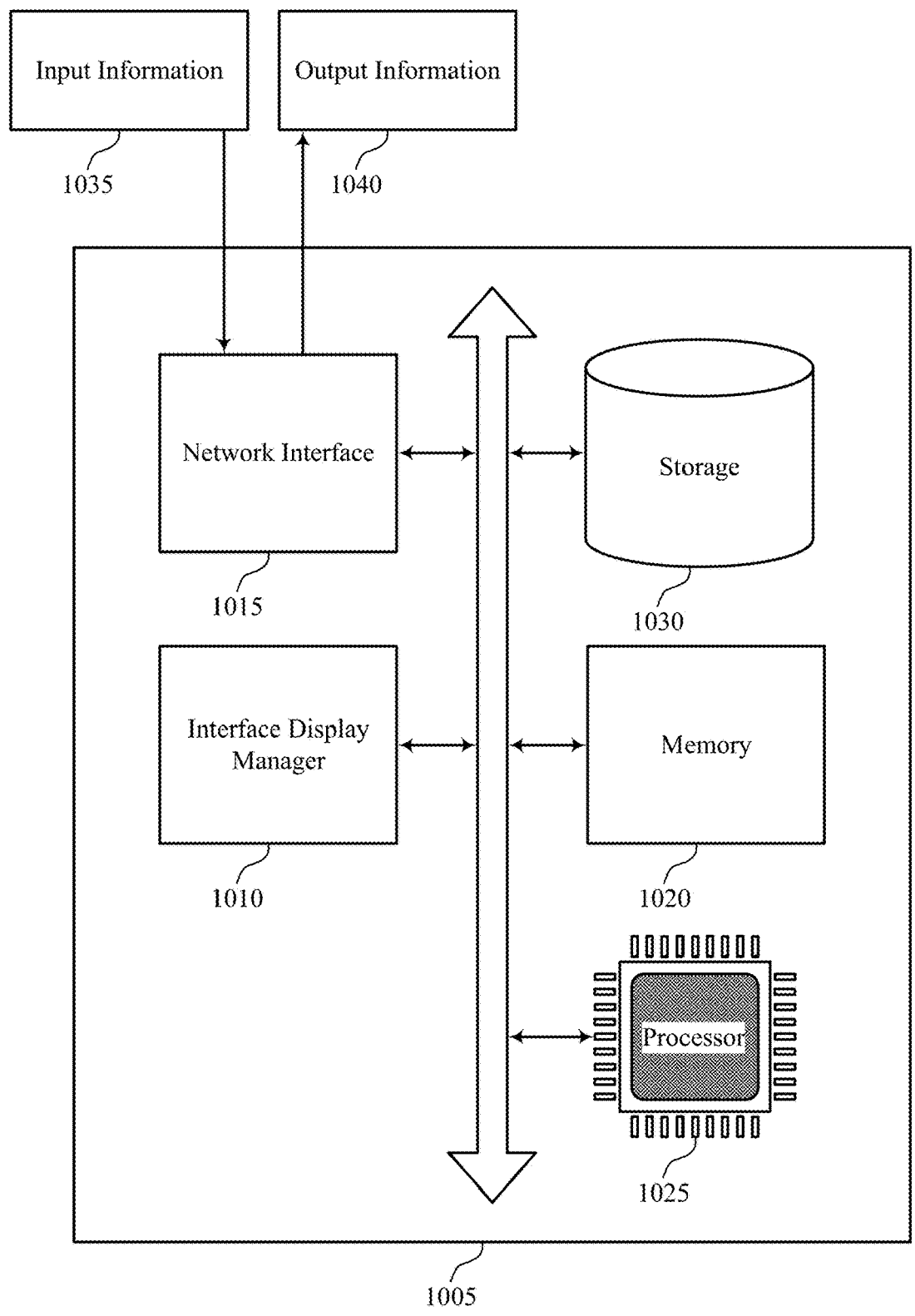
FIG. 10 shows a diagram of a system including a device that supports customizable dashboard interaction for a user interface in accordance with aspects of the present disclosure.

FIG. 10 shows a block diagram 1000 of a system 1005 that supports customizable dashboard interaction for a user interface in accordance with aspects of the present disclosure. The system 1005 may include components for data management, including components such as an interface display manager 1010, a network interface 1015, memory 1020, processor 1025, and storage 1030. These components may be in electronic communication or otherwise coupled with each other (e.g., operatively, communicatively, functionally, electronically, electrically; via one or more buses, communications links, communications interfaces, or any combination thereof). Additionally, the components of the system 1005 may comprise corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1015 may enable the system 1005 to exchange information (e.g., input information 1035, output information 1040, or both) with other systems or devices (not shown). For example, the network interface 1015 may enable the system 1005 to connect to a network (e.g., a network 120 as described herein). The network interface 1015 may include one or more wireless network interfaces, one or more wired network interfaces, or any combination thereof. In some examples, the network interface 1015 may be an example of may be an example of aspects of one or more components described with reference to FIG. 1, such as one or more network interfaces 165.

Memory 1020 may include RAM, ROM, or both. The memory 1020 may store computer-readable, computer-executable software including instructions that, when executed, cause the processor 1025 to perform various functions described herein. In some cases, the memory 1020 may contain, among other things, a basic input/output system (BIOS), which may control basic hardware or software operation such as the interaction with peripheral components or devices. In some cases, the memory 1020 may be an example of aspects of one or more components described with reference to FIG. 1, such as one or more memories 175.

The processor 1025 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 1025 may be configured to execute computer-readable instructions stored in a memory 1020 to perform various functions (e.g., functions or tasks supporting customizable dashboard interaction for a user interface). Though a single processor 1025 is depicted in the example of FIG. 10, it is to be understood that the system 1005 may include any quantity of one or more of processors 1025 and that a group of processors 1025 may collectively perform one or more functions ascribed herein to a processor, such as the processor 1025. In some cases, the processor 1025 may be an example of aspects of one or more components described with reference to FIG. 1, such as one or more processors 170.

Storage 1030 may be configured to store data that is generated, processed, stored, or otherwise used by the system 1005. In some cases, the storage 1030 may include one or more HDDs, one or more SDDs, or both. In some examples, the storage 1030 may be an example of a single database, a distributed database, multiple distributed databases, a data store, a data lake, or an emergency backup database. In some examples, the storage 1030 may be an example of one or more components described with reference to FIG. 1, such as one or more network disks 180.

The interface display manager 1010 may support displaying one or more widgets within a user interface in accordance with examples as disclosed herein. For example, the interface display manager 1010 may be configured as or otherwise support a means for displaying concurrently, within the user interface, a set of multiple candidate display regions for a first widget of the one or more widgets, where the set of multiple candidate display regions are at least partially overlapping within the user interface and have different respective sizes. The interface display manager 1010 may be configured as or otherwise support a means for adjusting a size of the first widget from a prior size to a first size in response to the first widget being moved within the user interface such that the first widget at least partially overlies a first candidate display region of the set of multiple candidate display regions, the first candidate display region having the first size. The interface display manager 1010 may be configured as or otherwise support a means for adjusting the size of the first widget from the first size to a second size in response to the first widget being moved within the user interface such that the first widget at least partially overlies a second candidate display region of the set of multiple candidate display regions, the second candidate display region having the second size. The interface display manager 1010 may be configured as or otherwise support a means for displaying the first widget within the second candidate display region after adjusting the size of the first widget to the second size.

By including or configuring the interface display manager 1010 in accordance with examples as described herein, the system 1005 may support techniques for customizable dashboard interaction for a user interface, which may provide one or more benefits such as, for example, improved user experience, improved user interface organization, reducing user time organizing a user interface, increased scalability, more efficient or optimized widget placement within a user interface, among other possibilities.

Figure 11:
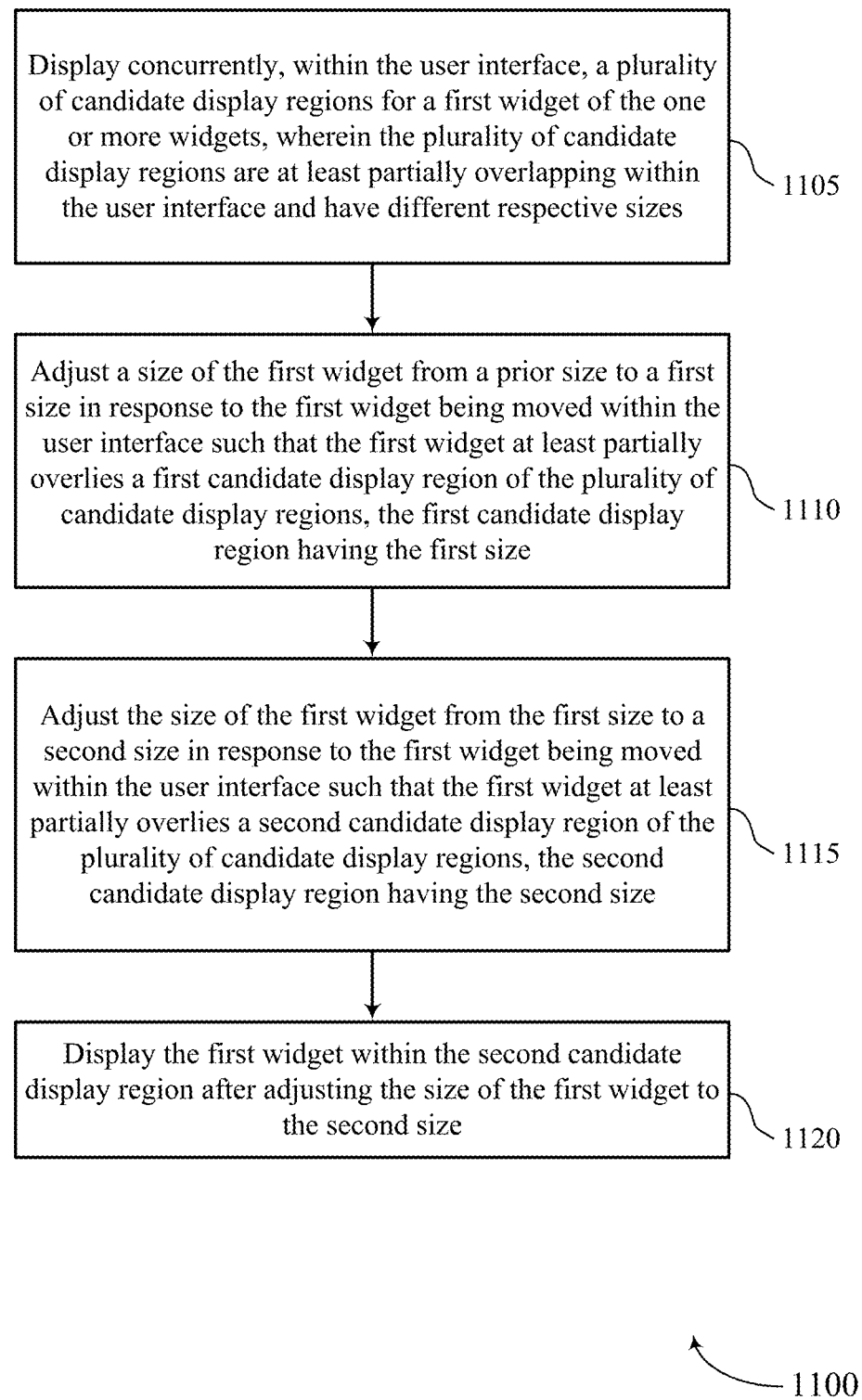
FIGS. 11 through 15 show flowcharts illustrating methods that support customizable dashboard interaction for a user interface in accordance with aspects of the present disclosure.

FIG. 11 shows a flowchart illustrating a method 1100 that supports customizable dashboard interaction for a user interface in accordance with aspects of the present disclosure. The operations of the method 1100 may be implemented by a DMS or its components as described herein. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include displaying concurrently, within the user interface, a set of multiple candidate display regions for a first widget of the one or more widgets, where the set of multiple candidate display regions are at least partially overlapping within the user interface and have different respective sizes. The operations of 1105 may be performed in accordance with examples as disclosed herein. In some examples, aspects of the operations of 1105 may be performed by a display region configuration component 925 as described with reference to FIG. 9.

At 1110, the method may include adjusting a size of the first widget from a prior size to a first size in response to the first widget being moved within the user interface such that the first widget at least partially overlies a first candidate display region of the set of multiple candidate display regions, the first candidate display region having the first size. The operations of 1110 may be performed in accordance with examples as disclosed herein. In some examples, aspects of the operations of 1110 may be performed by a widget adjustment component 930 as described with reference to FIG. 9.

At 1115, the method may include adjusting the size of the first widget from the first size to a second size in response to the first widget being moved within the user interface such that the first widget at least partially overlies a second candidate display region of the set of multiple candidate display regions, the second candidate display region having the second size. The operations of 1115 may be performed in accordance with examples as disclosed herein. In some examples, aspects of the operations of 1115 may be performed by a widget adjustment component 930 as described with reference to FIG. 9.

At 1120, the method may include displaying the first widget within the second candidate display region after adjusting the size of the first widget to the second size. The operations of 1120 may be performed in accordance with examples as disclosed herein. In some examples, aspects of the operations of 1120 may be performed by an interface display component 935 as described with reference to FIG. 9.

Figure 12:
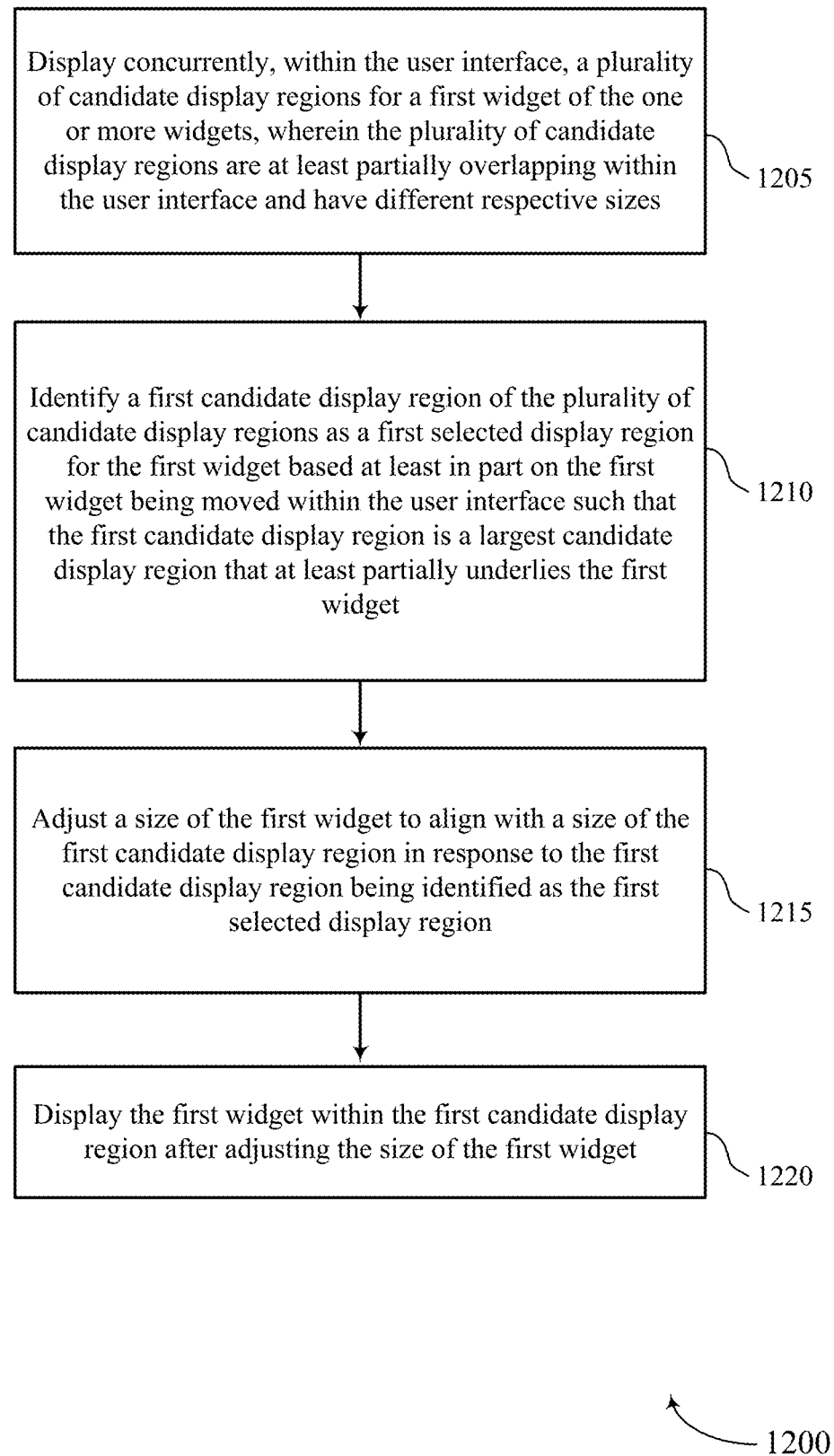

FIG. 12 shows a flowchart illustrating a method 1200 that supports customizable dashboard interaction for a user interface in accordance with aspects of the present disclosure. The operations of the method 1200 may be implemented by a DMS or its components as described herein. For example, the operations of the method 1200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include displaying concurrently, within the user interface, a set of multiple candidate display regions for a first widget of the one or more widgets, where the set of multiple candidate display regions are at least partially overlapping within the user interface and have different respective sizes. The operations of 1205 may be performed in accordance with examples as disclosed herein. In some examples, aspects of the operations of 1205 may be performed by a display region configuration component 925 as described with reference to FIG. 9.

At 1210, the method may include identifying a first candidate display region of the plurality of candidate display regions as a first selected display region for the first widget based on the first widget being moved within the user interface such that the first candidate display region is a largest candidate display region that at least partially underlies the first widget. The operations of 1210 may be performed in accordance with examples as disclosed herein. In some examples, aspects of the operations of 1210 may be performed by a display region selection component 940 as described with reference to FIG. 9.

At 1215, the method may include adjusting a size of the first widget to align with a size of the first candidate display region in response to the first candidate display region being identified as the first selected display region. The operations of 1215 may be performed in accordance with examples as disclosed herein. In some examples, aspects of the operations of 1215 may be performed by a widget adjustment component 930 as described with reference to FIG. 9.

At 1220, the method may include displaying the first widget within the first candidate display region after adjusting the size of the first widget. The operations of 1220 may be performed in accordance with examples as disclosed herein. In some examples, aspects of the operations of 1220 may be performed by an interface display component 935 as described with reference to FIG. 9.

Figure 13:
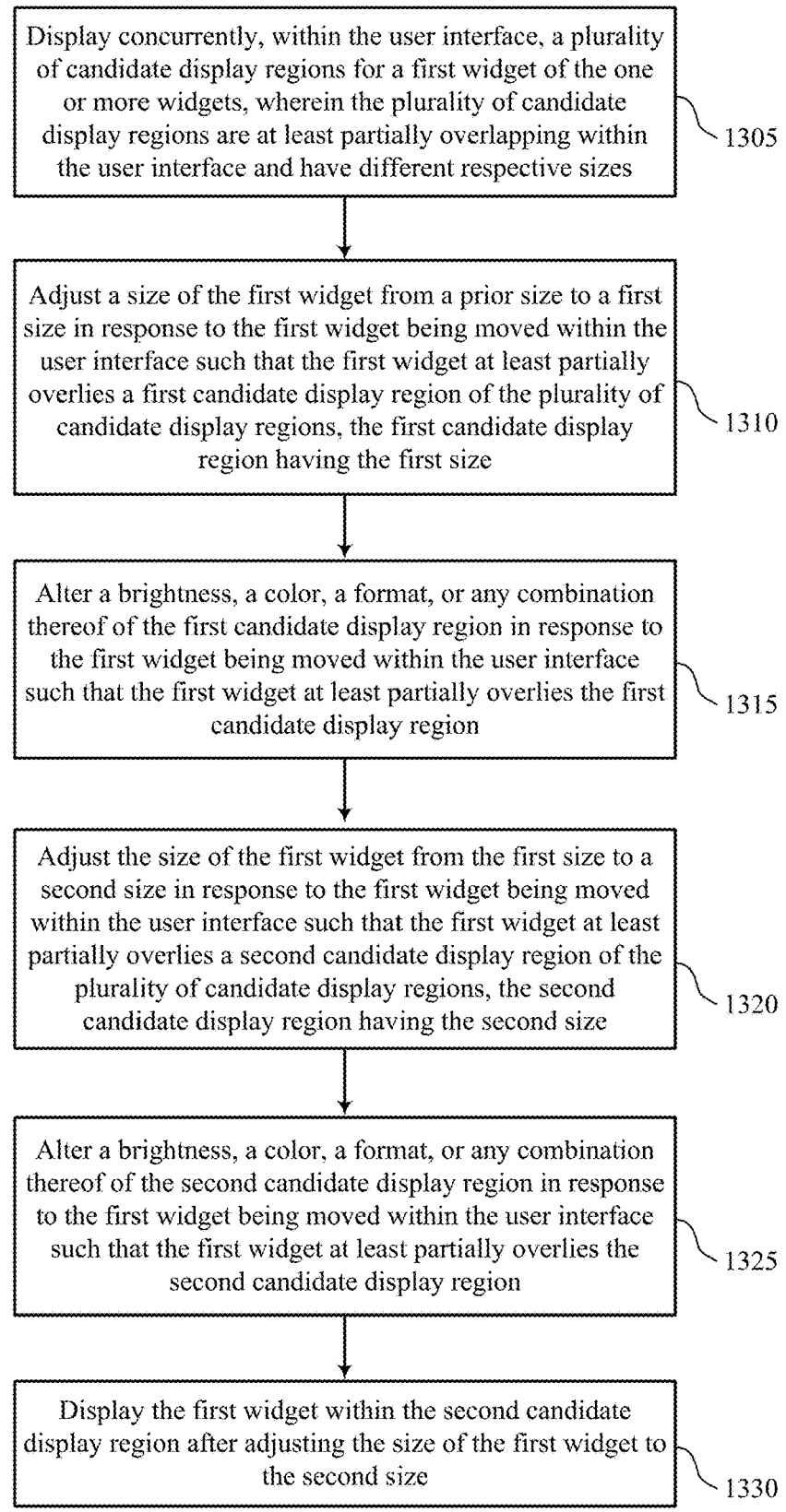

FIG. 13 shows a flowchart illustrating a method 1300 that supports customizable dashboard interaction for a user interface in accordance with aspects of the present disclosure. The operations of the method 1300 may be implemented by a DMS or its components as described herein. For example, the operations of the method 1300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include displaying concurrently, within the user interface, a set of multiple candidate display regions for a first widget of the one or more widgets, where the set of multiple candidate display regions are at least partially overlapping within the user interface and have different respective sizes. The operations of 1305 may be performed in accordance with examples as disclosed herein. In some examples, aspects of the operations of 1305 may be performed by a display region configuration component 925 as described with reference to FIG. 9.

At 1310, the method may include adjusting a size of the first widget from a prior size to a first size in response to the first widget being moved within the user interface such that the first widget at least partially overlies a first candidate display region of the set of multiple candidate display regions, the first candidate display region having the first size. The operations of 1310 may be performed in accordance with examples as disclosed herein. In some examples, aspects of the operations of 1310 may be performed by a widget adjustment component 930 as described with reference to FIG. 9.

At 1315, the method may include altering a brightness, a color, a format, or any combination thereof of the first candidate display region in response to the first widget being moved within the user interface such that the first widget at least partially overlies the first candidate display region. The operations of 1315 may be performed in accordance with examples as disclosed herein. In some examples, aspects of the operations of 1315 may be performed by a display region identification component 945 as described with reference to FIG. 9. Operations associated with 1310 and 1315 may occur in any order relative to each other and, in some cases, may occur concurrently.

At 1320, the method may include adjusting the size of the first widget from the first size to a second size in response to the first widget being moved within the user interface such that the first widget at least partially overlies a second candidate display region of the set of multiple candidate display regions, the second candidate display region having the second size. The operations of 1320 may be performed in accordance with examples as disclosed herein. In some examples, aspects of the operations of 1320 may be performed by a widget adjustment component 930 as described with reference to FIG. 9.

At 1325, the method may include altering a brightness, a color, a format, or any combination thereof of the second candidate display region in response to the first widget being moved within the user interface such that the first widget at least partially overlies the second candidate display region. The operations of 1325 may be performed in accordance with examples as disclosed herein. In some examples, aspects of the operations of 1325 may be performed by a display region identification component 945 as described with reference to FIG. 9. Operations associated with 1320 and 1325 may occur in any order relative to each other and, in some cases, may occur concurrently.

At 1330, the method may include displaying the first widget within the second candidate display region after adjusting the size of the first widget to the second size. The operations of 1330 may be performed in accordance with examples as disclosed herein. In some examples, aspects of the operations of 1330 may be performed by an interface display component 935 as described with reference to FIG. 9.

Figure 14:
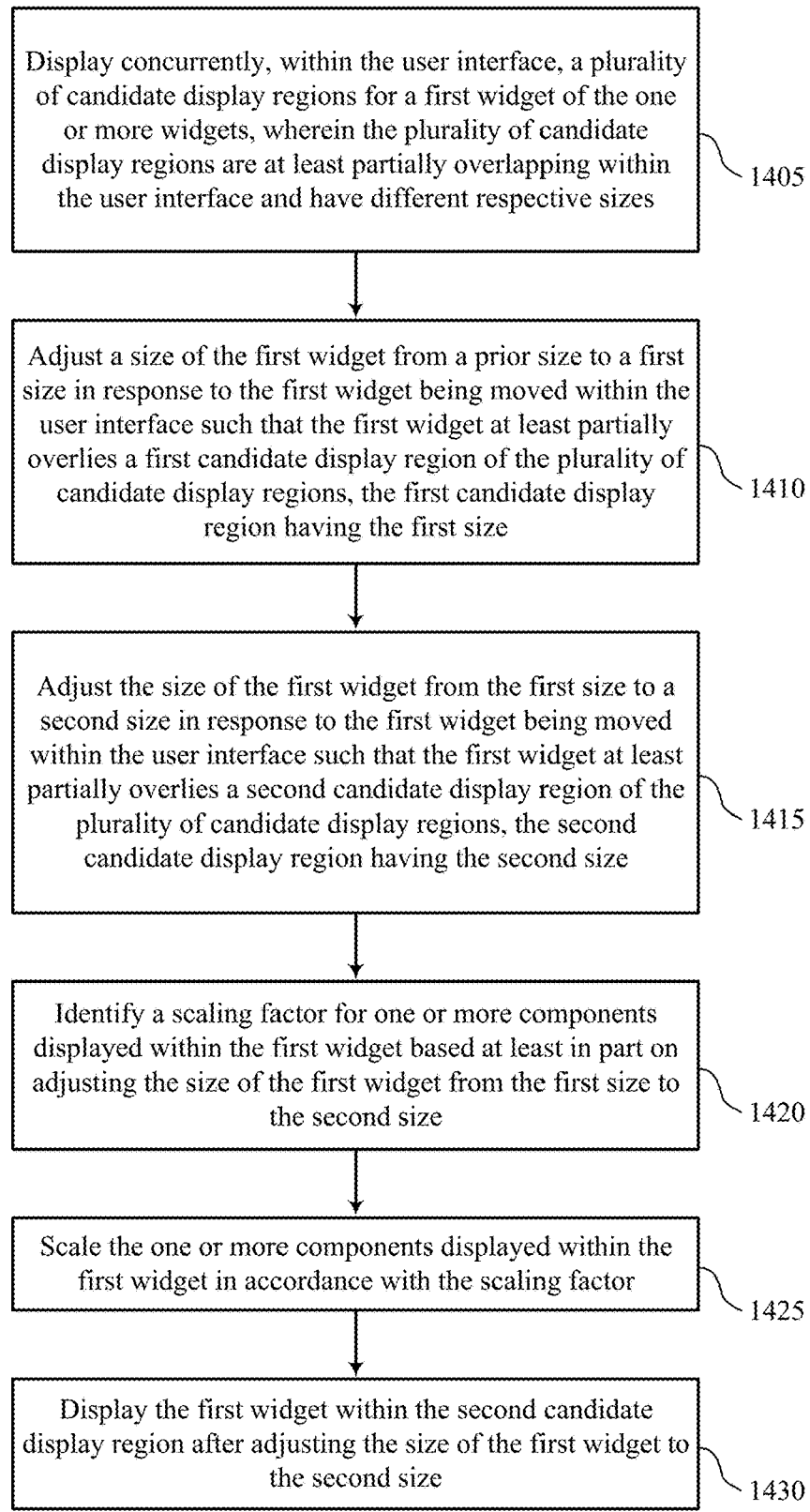

FIG. 14 shows a flowchart illustrating a method 1400 that supports customizable dashboard interaction for a user interface in accordance with aspects of the present disclosure. The operations of the method 1400 may be implemented by a DMS or its components as described herein. For example, the operations of the method 1400 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1405, the method may include displaying concurrently, within the user interface, a set of multiple candidate display regions for a first widget of the one or more widgets, where the set of multiple candidate display regions are at least partially overlapping within the user interface and have different respective sizes. The operations of 1405 may be performed in accordance with examples as disclosed herein. In some examples, aspects of the operations of 1405 may be performed by a display region configuration component 925 as described with reference to FIG. 9.

At 1410, the method may include adjusting a size of the first widget from a prior size to a first size in response to the first widget being moved within the user interface such that the first widget at least partially overlies a first candidate display region of the set of multiple candidate display regions, the first candidate display region having the first size. The operations of 1410 may be performed in accordance with examples as disclosed herein. In some examples, aspects of the operations of 1410 may be performed by a widget adjustment component 930 as described with reference to FIG. 9.

At 1415, the method may include adjusting the size of the first widget from the first size to a second size in response to the first widget being moved within the user interface such that the first widget at least partially overlies a second candidate display region of the set of multiple candidate display regions, the second candidate display region having the second size. The operations of 1415 may be performed in accordance with examples as disclosed herein. In some examples, aspects of the operations of 1415 may be performed by a widget adjustment component 930 as described with reference to FIG. 9.

At 1420, the method may include identifying a scaling factor for one or more components displayed within the first widget based on adjusting the size of the first widget from the first size to the second size. The operations of 1420 may be performed in accordance with examples as disclosed herein. In some examples, aspects of the operations of 1420 may be performed by a widget adjustment component 930 as described with reference to FIG. 9.

At 1425, the method may include scaling the one or more components displayed within the first widget in accordance with the scaling factor. The operations of 1425 may be performed in accordance with examples as disclosed herein. In some examples, aspects of the operations of 1425 may be performed by a widget adjustment component 930 as described with reference to FIG. 9. Operations associated with 1415 and 1425 may occur in any order relative to each other and, in some cases, may occur concurrently.

At 1430, the method may include displaying the first widget within the second candidate display region after adjusting the size of the first widget to the second size. The operations of 1430 may be performed in accordance with examples as disclosed herein. In some examples, aspects of the operations of 1430 may be performed by an interface display component 935 as described with reference to FIG. 9.

Figure 15:
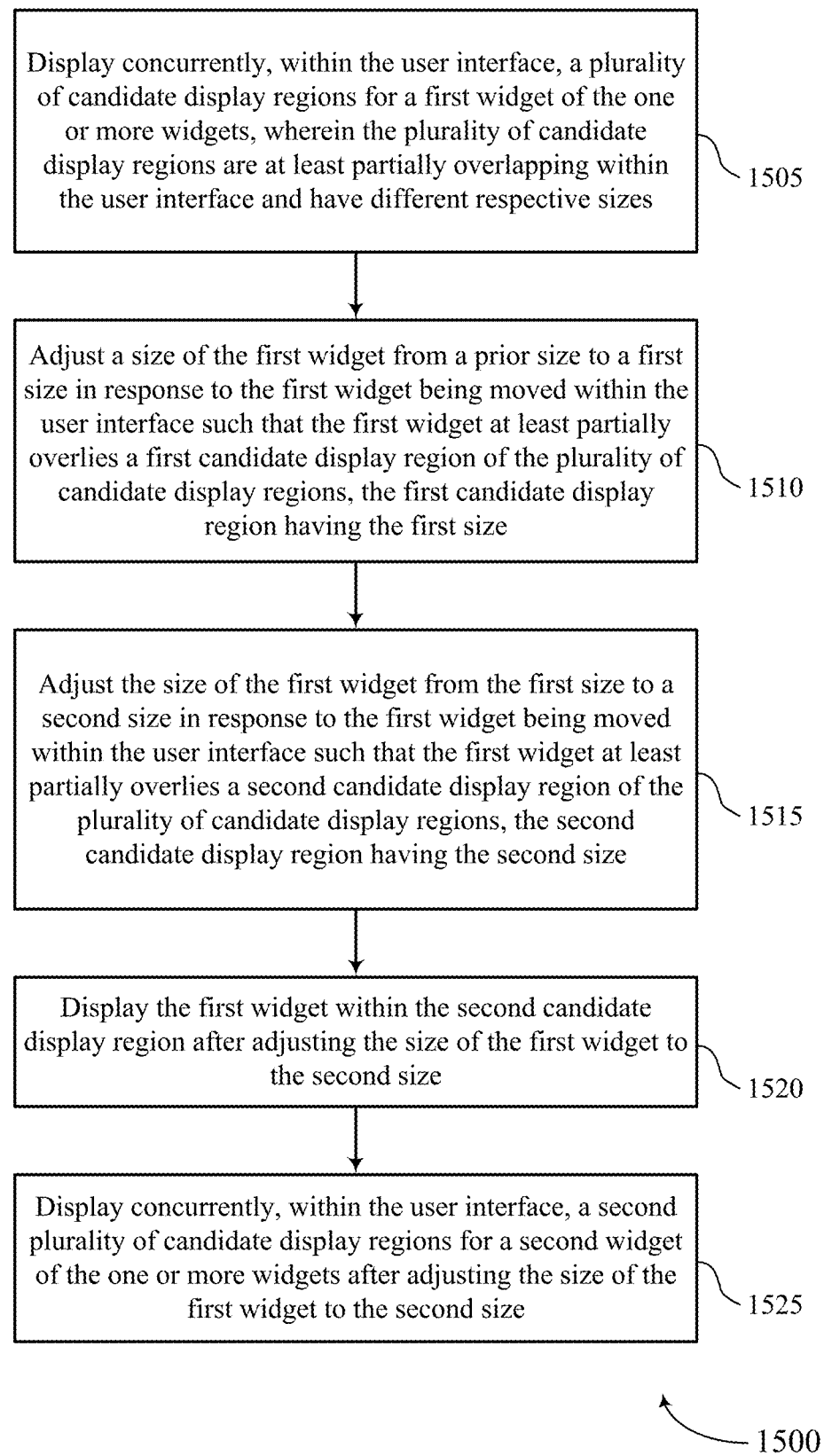

FIG. 15 shows a flowchart illustrating a method 1500 that supports customizable dashboard interaction for a user interface in accordance with aspects of the present disclosure. The operations of the method 1500 may be implemented by a DMS or its components as described herein. For example, the operations of the method 1500 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1505, the method may include displaying concurrently, within the user interface, a set of multiple candidate display regions for a first widget of the one or more widgets, where the set of multiple candidate display regions are at least partially overlapping within the user interface and have different respective sizes. The operations of 1505 may be performed in accordance with examples as disclosed herein. In some examples, aspects of the operations of 1505 may be performed by a display region configuration component 925 as described with reference to FIG. 9.

At 1510, the method may include adjusting a size of the first widget from a prior size to a first size in response to the first widget being moved within the user interface such that the first widget at least partially overlies a first candidate display region of the set of multiple candidate display regions, the first candidate display region having the first size. The operations of 1510 may be performed in accordance with examples as disclosed herein. In some examples, aspects of the operations of 1510 may be performed by a widget adjustment component 930 as described with reference to FIG. 9.

At 1515, the method may include adjusting the size of the first widget from the first size to a second size in response to the first widget being moved within the user interface such that the first widget at least partially overlies a second candidate display region of the set of multiple candidate display regions, the second candidate display region having the second size. The operations of 1515 may be performed in accordance with examples as disclosed herein. In some examples, aspects of the operations of 1515 may be performed by a widget adjustment component 930 as described with reference to FIG. 9.

At 1520, the method may include displaying the first widget within the second candidate display region after adjusting the size of the first widget to the second size. The operations of 1520 may be performed in accordance with examples as disclosed herein. In some examples, aspects of the operations of 1520 may be performed by an interface display component 935 as described with reference to FIG. 9.

At 1525, the method may include displaying concurrently, within the user interface, a second set of multiple candidate display regions for a second widget of the one or more widgets after adjusting the size of the first widget to the second size. The operations of 1525 may be performed in accordance with examples as disclosed herein. In some examples, aspects of the operations of 1525 may be performed by a display region configuration component 925 as described with reference to FIG. 9.

A method for displaying one or more widgets within a user interface is described. The method may include displaying concurrently, within the user interface, a set of multiple candidate display regions for a first widget of the one or more widgets, where the set of multiple candidate display regions are at least partially overlapping within the user interface and have different respective sizes, adjusting a size of the first widget from a prior size to a first size in response to the first widget being moved within the user interface such that the first widget at least partially overlies a first candidate display region of the set of multiple candidate display regions, the first candidate display region having the first size, adjusting the size of the first widget from the first size to a second size in response to the first widget being moved within the user interface such that the first widget at least partially overlies a second candidate display region of the set of multiple candidate display regions, the second candidate display region having the second size, and displaying the first widget within the second candidate display region after adjusting the size of the first widget to the second size.

An apparatus for displaying one or more widgets within a user interface is described. The apparatus may include at least one processor, memory coupled with the processor, and instructions stored in the memory. The instructions may be executable by the at least one processor to cause the apparatus to display concurrently, within the user interface, a set of multiple candidate display regions for a first widget of the one or more widgets, where the set of multiple candidate display regions are at least partially overlapping within the user interface and have different respective sizes, adjust a size of the first widget from a prior size to a first size in response to the first widget being moved within the user interface such that the first widget at least partially overlies a first candidate display region of the set of multiple candidate display regions, the first candidate display region having the first size, adjust the size of the first widget from the first size to a second size in response to the first widget being moved within the user interface such that the first widget at least partially overlies a second candidate display region of the set of multiple candidate display regions, the second candidate display region having the second size, and display the first widget within the second candidate display region after adjusting the size of the first widget to the second size.

Another apparatus for displaying one or more widgets within a user interface is described. The apparatus may include means for displaying concurrently, within the user interface, a set of multiple candidate display regions for a first widget of the one or more widgets, where the set of multiple candidate display regions are at least partially overlapping within the user interface and have different respective sizes, means for adjusting a size of the first widget from a prior size to a first size in response to the first widget being moved within the user interface such that the first widget at least partially overlies a first candidate display region of the set of multiple candidate display regions, the first candidate display region having the first size, means for adjusting the size of the first widget from the first size to a second size in response to the first widget being moved within the user interface such that the first widget at least partially overlies a second candidate display region of the set of multiple candidate display regions, the second candidate display region having the second size, and means for displaying the first widget within the second candidate display region after adjusting the size of the first widget to the second size.

A non-transitory computer-readable medium storing code for displaying one or more widgets within a user interface is described. The code may include instructions executable by at least one processor to display concurrently, within the user interface, a set of multiple candidate display regions for a first widget of the one or more widgets, where the set of multiple candidate display regions are at least partially overlapping within the user interface and have different respective sizes, adjust a size of the first widget from a prior size to a first size in response to the first widget being moved within the user interface such that the first widget at least partially overlies a first candidate display region of the set of multiple candidate display regions, the first candidate display region having the first size, adjust the size of the first widget from the first size to a second size in response to the first widget being moved within the user interface such that the first widget at least partially overlies a second candidate display region of the set of multiple candidate display regions, the second candidate display region having the second size, and display the first widget within the second candidate display region after adjusting the size of the first widget to the second size.

Some examples of the method, apparatuses, and non-transitory computer-readable medium described herein may further include operations, features, means, or instructions for identifying the first candidate display region as a first selected display region for the first widget based on the first candidate display region being a largest candidate display region that at least partially underlies the first widget, where adjusting the size of the first widget from the prior size to the first size may be based on identifying the first candidate display region as the first selected display region for the first widget.

In some examples of the method, apparatuses, and non-transitory computer-readable medium described herein, operations, features, means, or instructions for adjusting the size of the first widget from the first size to the second size may include operations, features, means, or instructions for increasing the size of the first widget based on the second candidate display region being larger than the first candidate display region and the first widget newly overlying at least a portion of the second candidate display region.

In some examples of the method, apparatuses, and non-transitory computer-readable medium described herein, operations, features, means, or instructions for adjusting the size of the first widget from the first size to the second size may include operations, features, means, or instructions for decreasing the size of the first widget based on the second candidate display region being smaller than the first candidate display region and the first widget ceasing to at least partially overly the first candidate display region.

Some examples of the method, apparatuses, and non-transitory computer-readable medium described herein may further include operations, features, means, or instructions for altering a brightness, a color, a format, or any combination thereof of the first candidate display region in response to the first widget being moved within the user interface such that the first widget at least partially overlies the first candidate display region and altering a brightness, a color, a format, or any combination thereof of the second candidate display region in response to the first widget being moved within the user interface such that the first widget at least partially overlies the second candidate display region.

Some examples of the method, apparatuses, and non-transitory computer-readable medium described herein may further include operations, features, means, or instructions for identifying a scaling factor for one or more components displayed within the first widget based on adjusting the size of the first widget from the first size to the second size and scaling the one or more components displayed within the first widget in accordance with the scaling factor.

Some examples of the method, apparatuses, and non-transitory computer-readable medium described herein may further include operations, features, means, or instructions for modifying a quantity of components displayed within the first widget based on adjusting the size of the first widget from the first size to the second size, scaling the one or more components, or both.

In some examples of the method, apparatuses, and non-transitory computer-readable medium described herein, the different respective sizes for the set of multiple candidate display regions may be based on an amount of space available for the first widget relative to one or more other widgets present within the user interface.

In some examples of the method, apparatuses, and non-transitory computer-readable medium described herein, at least two candidate display regions included in the set of multiple candidate display regions may have a common height or a common width.

In some examples of the method, apparatuses, and non-transitory computer-readable medium described herein, at least two candidate display regions included in the set of multiple candidate display regions may have a common boundary.

In some examples of the method, apparatuses, and non-transitory computer-readable medium described herein, at least two candidate display regions included in the set of multiple candidate display regions may have a common corner.

Some examples of the method, apparatuses, and non-transitory computer-readable medium described herein may further include operations, features, means, or instructions for displaying concurrently, within the user interface, a second set of multiple candidate display regions for a second widget of the one or more widgets after adjusting the size of the first widget to the second size.

Some examples of the method, apparatuses, and non-transitory computer-readable medium described herein may further include operations, features, means, or instructions for displaying, within the user interface, one or more suggested locations for additional widgets after displaying the first widget within the second candidate display region, where the one or more suggested locations for additional widgets may be aligned horizontally or vertically aligned with the second candidate display region.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for displaying one or more widgets within a user interface, comprising:
    displaying concurrently, within the user interface, a plurality of candidate display regions for a first widget of the one or more widgets, wherein the plurality of candidate display regions are at least partially overlapping within the user interface and have different respective sizes;
    identifying a first candidate display region of the plurality of candidate display regions as a first selected display region for the first widget in response to the first widget being moved within the user interface such that, at a first time, the first widget at least partially overlies the first candidate display region, wherein the first candidate display region is identified as the first selected display region for the first widget based at least in part on the first candidate display region being larger than any other candidate display region that also at least partially underlies the first widget at the first time;
    adjusting a size of the first widget from a prior size to a first size based at least in part on identifying the first candidate display region as the first selected display region for the first widget, the first candidate display region having the first size;
    identifying a second candidate display region of the plurality of candidate display regions as a second selected display region for the first widget in response to the first widget being moved within the user interface such that, at a second time that is after the first time, the first widget at least partially overlies the second candidate display region of the plurality of candidate display regions, wherein the second candidate display region is identified as the second selected display region for the first widget based at least in part on the second candidate display region being larger than any other candidate display region that also at least partially underlies the first widget at the second time, and wherein the second candidate display region at least partially overlaps the first candidate display region;
    adjusting the size of the first widget from the first size to a second size based at least in part on identifying the second candidate display region as the second selected display region for the first widget, the second candidate display region having the second size; and
    displaying the first widget within the second candidate display region after adjusting the size of the first widget to the second size.

2. The method of claim 1, wherein the first widget does not overlie the second candidate display region at the first time, and wherein adjusting the size of the first widget from the first size to the second size comprises increasing the size of the first widget based at least in part on the second candidate display region being larger than the first candidate display region and the first widget overlying at least a portion of the second candidate display region at the second time.

3. The method of claim 1, wherein the first widget at least partially overlies the second candidate display region at the first time, and wherein adjusting the size of the first widget from the first size to the second size comprises decreasing the size of the first widget based at least in part on the second candidate display region being smaller than the first candidate display region and the first widget not at least partially overlying the first candidate display region at the second time.

4. The method of claim 1, further comprising:
    altering a brightness, a color, a format, or any combination thereof of the first candidate display region in response to the first widget being moved within the user interface such that the first widget at least partially overlies the first candidate display region; and
    altering a brightness, a color, a format, or any combination thereof of the second candidate display region in response to the first widget being moved within the user interface such that the first widget at least partially overlies the second candidate display region.

5. The method of claim 1, further comprising:
    identifying a scaling factor for one or more components displayed within the first widget based at least in part on adjusting the size of the first widget from the first size to the second size; and
    scaling the one or more components displayed within the first widget in accordance with the scaling factor.

6. The method of claim 5, further comprising:
    modifying a quantity of components displayed within the first widget based at least in part on adjusting the size of the first widget from the first size to the second size, scaling the one or more components, or both.

7. The method of claim 1, wherein the different respective sizes for the plurality of candidate display regions are based at least in part on an amount of space available for the first widget relative to one or more other widgets present within the user interface.

8. The method of claim 1, wherein at least two candidate display regions included in the plurality of candidate display regions have a common height or a common width.

9. The method of claim 1, wherein at least two candidate display regions included in the plurality of candidate display regions have a common boundary.

10. The method of claim 1, wherein at least two candidate display regions included in the plurality of candidate display regions have a common corner.

11. The method of claim 1, further comprising:
    displaying concurrently, within the user interface, a second plurality of candidate display regions for a second widget of the one or more widgets after adjusting the size of the first widget to the second size.

12. The method of claim 1, further comprising:
    displaying, within the user interface, one or more suggested locations for additional widgets after displaying the first widget within the second candidate display region, wherein the one or more suggested locations for the additional widgets are aligned horizontally or vertically aligned with the second candidate display region.

13. An apparatus displaying one or more widgets within a user interface, comprising:
- at least one processor;
- memory coupled with the at least one processor; and
- instructions stored in the memory and executable by the at least one processor to cause the apparatus to:
  - display concurrently, within the user interface, a plurality of candidate display regions for a first widget of the one or more widgets, wherein the plurality of candidate display regions are at least partially overlapping within the user interface and have different respective sizes;
  - identify a first candidate display region of the plurality of candidate display regions as a first selected display region for the first widget in response to the first widget being moved within the user interface such that, at a first time, the first widget at least partially overlies the first candidate display region, wherein the first candidate display region is identified as the first selected display region for the first widget based at least in part on the first candidate display region being larger than any other candidate display region that also at least partially underlies the first widget at the first time;
  - adjust a size of the first widget from a prior size to a first size based at least in part on identifying the first candidate display region as the first selected display region for the first widget, the first candidate display region having the first size;
  - identify a second candidate display region of the plurality of candidate display regions as a second selected display region for the first widget in response to the first widget being moved within the user interface such that, at a second time that is after the first time, the first widget at least partially overlies the second candidate display region of the plurality of candidate display regions, wherein the second candidate display region is identified as the second selected display region for the first widget based at least in part on the second candidate display region being larger than any other candidate display region that also at least partially underlies the first widget at the second time, and wherein the second candidate display region at least partially overlaps the first candidate display region;
  - adjust the size of the first widget from the first size to a second size based at least in part on identifying the second candidate display region as the second selected display region for the first widget, the second candidate display region having the second size; and
  - display the first widget within the second candidate display region after adjusting the size of the first widget to the second size.

14. The apparatus of claim 13, wherein the first widget does not overlie the second candidate display region at the first time, and wherein adjusting the size of the first widget from the first size to the second size comprises increasing the size of the first widget based at least in part on the second candidate display region being larger than the first candidate display region and the first widget overlying at least a portion of the second candidate display region at the second time.

15. The apparatus of claim 10, wherein the first widget at least partially overlies the second candidate display region at the first time, and wherein adjusting the size of the first widget from the first size to the second size comprises decreasing the size of the first widget based at least in part on the second candidate display region being smaller than the first candidate display region and the first widget not at least partially overlying the first candidate display region at the second time.

16. The apparatus of claim 13, wherein the instructions are further executable by the at least one processor to cause the apparatus to:
- alter a brightness, a color, a format, or any combination thereof of the first candidate display region in response to the first widget being moved within the user interface such that the first widget at least partially overlies the first candidate display region; and
- alter a brightness, a color, a format, or any combination thereof of the second candidate display region in response to the first widget being moved within the user interface such that the first widget at least partially overlies the second candidate display region.

17. The apparatus of claim 13, wherein the instructions are further executable by the at least one processor to cause the apparatus to:
- identify a scaling factor for one or more components displayed within the first widget based at least in part on adjusting the size of the first widget from the first size to the second size; and
- scale the one or more components displayed within the first widget in accordance with the scaling factor.

18. A non-transitory computer-readable medium storing code for displaying one or more widgets within a user interface, the code comprising instructions executable by at least one processor to:
- display concurrently, within the user interface, a plurality of candidate display regions for a first widget of the one or more widgets, wherein the plurality of candidate display regions are at least partially overlapping within the user interface and have different respective sizes;
- identify a first candidate display region of the plurality of candidate display regions as a first selected display region for the first widget in response to the first widget being moved within the user interface such that, at a first time, the first widget at least partially overlies the first candidate display region, wherein the first candidate display region is identified as the first selected display region for the first widget based at least in part on the first candidate display region being larger than any other candidate display region that also at least partially underlies the first widget at the first time;
- adjust a size of the first widget from a prior size to a first size based at least in part on identifying the first candidate display region as the first selected display region for the first widget, the first candidate display region having the first size;
- identify a second candidate display region of the plurality of candidate display regions as a second selected display region for the first widget in response to the first widget being moved within the user interface such that, at a second time that is after the first time, the first widget at least partially overlies the second candidate display region of the plurality of candidate display regions, wherein the second candidate display region is identified as the second selected display region for the first widget based at least in part on the second candidate display region being larger than any other candidate display region that also at least partially underlies the first widget at the second time, and wherein the second candidate display region at least partially overlaps the first candidate display region;

adjust the size of the first widget from the first size to a second size based at least in part on identifying the second candidate display region as the second selected display region for the first widget, the second candidate display region having the second size; and display the first widget within the second candidate display region after adjusting the size of the first widget to the second size.

\* \* \* \* \*